United States Patent
Kupfer et al.

(10) Patent No.: US 10,498,749 B2
(45) Date of Patent: Dec. 3, 2019

(54) SYSTEMS AND METHODS FOR IN-VEHICLE NETWORK INTRUSION DETECTION

(71) Applicant: GM GLOBAL TECHNOLOGY OPERATIONS LLC, Detroit, MI (US)

(72) Inventors: Samuel B. Kupfer, Oak Park, MI (US); Joseph E. Ploucha, Commerce Township, MI (US); Abigail C. Shockley, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 201 days.

(21) Appl. No.: 15/700,725

(22) Filed: Sep. 11, 2017

(65) Prior Publication Data

US 2019/0081960 A1    Mar. 14, 2019

(51) Int. Cl.
*H04L 29/06* (2006.01)
*H04L 12/40* (2006.01)
(Continued)

(52) U.S. Cl.
CPC .......... *H04L 63/1416* (2013.01); *H04L 12/40* (2013.01); *H04L 12/40202* (2013.01); *H04L 63/1425* (2013.01); *H04L 63/1441* (2013.01); *H04W 12/12* (2013.01); *H04L 67/12* (2013.01); *H04L 2012/40215* (2013.01)

(58) Field of Classification Search
CPC .......... H04L 63/1416; H04L 12/40202; H04L 63/1441; H04L 63/1425; H04L 12/40; H04L 2012/40215; H04L 67/12
See application file for complete search history.

(56) References Cited

U.S. PATENT DOCUMENTS

| | | | |
|---|---|---|---|
| 7,436,322 B2 * | 10/2008 | Crank | B64D 45/0015 340/945 |
| 8,321,941 B2 * | 11/2012 | Tuvell | G06F 21/56 726/24 |

(Continued)

OTHER PUBLICATIONS

Parker II, Charles (2017). Intrusion Detection Systems (IDS): Finally for the Vehicles. Retrieved from http://www.nationalcybersecurityinstitute.org/general-public-interests/intrusion-detection-systems-ids-finally-for-the-vehicles/.

(Continued)

*Primary Examiner* — Mahfuzur Rahman

(57) ABSTRACT

A system for in-vehicle network intrusion detection includes: (i) an anomaly detection module configured to obtain one or more network messages from one or more communication buses of a vehicle describing one or more events associated with the vehicle and detect whether at least some of the one or more events constitute an anomaly based on predefined rules to provide detected anomaly event data; (ii) a resident log generation module configured to generate one or more resident incident logs based on the detected anomaly event data, wherein the one or more resident incident logs comprise metadata associated with one or more detected anomalous events; and (iii) a transmitted log generation module configured to generate one or more transmitted incident logs based on the one or more resident incident logs, wherein each of the one or more transmitted incident logs corresponds to a resident incident log.

21 Claims, 14 Drawing Sheets

(51) Int. Cl.
*H04W 12/12* (2009.01)
*H04L 29/08* (2006.01)

(56) References Cited

U.S. PATENT DOCUMENTS

| | | | | |
|---|---|---|---|---|
| 2012/0053778 | A1* | 3/2012 | Colvin | G07C 5/008 |
| | | | | 701/29.4 |
| 2012/0136527 | A1* | 5/2012 | McQuade | G06Q 30/0611 |
| | | | | 701/29.4 |
| 2012/0136743 | A1* | 5/2012 | McQuade | G06Q 30/0611 |
| | | | | 705/26.3 |
| 2012/0136802 | A1* | 5/2012 | McQuade | G06Q 30/0282 |
| | | | | 705/347 |
| 2018/0047225 | A1* | 2/2018 | Batcheller | G07C 5/008 |
| 2018/0050800 | A1* | 2/2018 | Boykin | H04N 5/23206 |

OTHER PUBLICATIONS

Parker II, Charles (2017). Intrusion Detection Systems (IDS): Finally for the Vehicles Part 2. Retrieved from http://www.nationalcybersecurityinstitute.org/general-public-interests/intrusion-detection-systems-ids-finally-for-the-vehicles-part-2.
Li, Jun Unicorn Team + Qing Yang—founder & director of Radio Security Research Department and UnicornTeam, Qihoo 360 (2017). Automotive Intrusion Detection. Retrieved from https://cansecwest.com/slides/2017/CSW2017_JunLi_Car_anomaly_detection.pdf.
U.S. Appl. No. 15/700,605, filed Sep. 11, 2017, Ploucha et al.

\* cited by examiner

SYSTEMS AND METHODS FOR IN-VEHICLE NETWORK INTRUSION DETECTION

CROSS-REFERENCE TO RELATED APPLICATIONS

The present disclosure is related to U.S. application Ser. No. 15/700,605, filed on Sep. 11, 2017. The entire disclosures of the applications referenced above are incorporated herein by reference.

INTRODUCTION

The introduction provided here is for the purpose of generally presenting the context of the disclosure. Work of the presently named inventors, to the extent it is described in this introduction section as well as other aspects of the description are neither expressly nor impliedly admitted as prior art against the present disclosure.

The present disclosure relates to systems and methods for monitoring networks for potential malicious activity and, more particularly, to systems and methods for detecting and responding to potential intrusions within an in-vehicle network.

A Intrusion Detection System (IDS) is a device or application software used to monitor network traffic for abnormal or malicious activity based on policy violations. The system may report any detected activity to an administrator who can decide whether to take action based on the report.

SUMMARY

In a feature, a system is provided. The system may include an anomaly detection module, a resident log generation module, and a transmitted log generation module. The anomaly detection module may be configured to obtain one or more network messages from one or more communication buses of a vehicle. The one or more network messages may describe one or more events associated with the vehicle. The anomaly detection module may be further configured to detect whether at least some of the one or more events constitute an anomaly based on predefined rules to provide detected anomaly event data. The resident log generation module may be configured to obtain the detected anomaly event data and generate one or more resident incident logs based on the detected anomaly event data. The one or more resident incident logs may include metadata associated with one or more detected anomalous events. The transmitted log generation module may be configured to obtain the one or more resident logs and generate one or more transmitted incident logs based on the one or more resident incident logs. Each of the one or more transmitted incident logs may correspond to a resident incident log. In addition, the transmitted log generation module may be configured to transmit the one or more transmitted incident logs to a computer system remote from the vehicle.

In a feature, the system may also include an electronic control unit (ECU). The ECU may include memory. The memory may include at least some of the one or more resident incident logs. In one example of the foregoing feature, the ECU may be further configured to obtain a log control command from the computer system remote from the vehicle. In response to obtaining the log control command, the ECU may perform at least one of the following actions: (i) erase at least one resident incident log of the one or more resident incident logs; and/or (ii) adjust a memory allocation for at least one of the one or more resident incident logs.

In one feature, the transmitted log generation module of the system is further configured to obtain a log control command from the computer system remote from the vehicle. In response to obtaining the log control command, the transmitted log generation module may perform at least one of the following actions: (i) transmit at least one of the one or more resident incident logs to the computer system remote from the vehicle; (ii) adjust content of at least one of the one or more resident incident logs prior to transmission; (iii) adjust a log transmission rate associated with the transmitted log generation module, whereby the log transmission rate describes a frequency at which transmitted incident logs are transmitted from the transmitted log generation module to the computer system remote from the vehicle; and/or (iv) restrict a data size of the one or more transmitted incident logs.

In another feature, the system may include a remedial action module. The remedial action module may be configured to obtain an intrusion response command from the computer system remote from the vehicle. In response to obtaining the intrusion response command, the remedial action module may perform at least one of the following actions: (i) restrict communications from at least one of the one or more communication buses; and/or (ii) illuminate a malfunction indicator light (MIL) of the vehicle.

In a feature, each resident incident log of the one or more resident incident logs may include a manifest and one or more incident log entries. Each incident log entry of the one or more incident log entries may correspond to a violation of one or more of the predefined rules. In one example of the foregoing feature, the manifest may include (i) a soft-part reference number identifying a rule set of the predefined rules to which a given resident incident log corresponds; and (ii) a total rule violations summary describing a total number of incidents logged for all rule violations within a given rule set defined by the soft-part reference number. In another example of the foregoing feature, each of the one or more incident log entries may include one or more of the following: (i) the predefined rule that was violated; (ii) a number of times that the predefined rule was violated; (iii) a timeframe during which the predefined rule was violated; (iv) the network message that violated the rule; and/or (iv) historical data concerning the incident, whereby the historical data may include one or more of a timestamp describing a specific time that the rule was violated and a state of the vehicle at the time that the rule was violated.

In another feature, the one or more network messages may include one or more of the following: (i) controller area network (CAN) messages from one or more CAN buses of the vehicle; and/or (ii) ethernet messages from one or more ethernet buses of the vehicle.

In one feature, the predefined rules may be based, at least in part, on operating state parameters of the vehicle. In one example of the foregoing feature, the operating state parameters of the vehicle may include at least some of the following parameters: (i) speed of the vehicle; (ii) operational mode of the vehicle; (iii) power mode of the vehicle; (iv) state of a transmission gear selector of the vehicle; and/or (v) presence of a test tool in connection with the vehicle.

In another feature, the system may include the computer system remote from the vehicle. In one example of the foregoing feature, the computer system remote from the vehicle may be configured to generate an acknowledgement signal in response to receiving a transmitted incident log from the transmitted log generation module and transmit the acknowledgment signal to the vehicle over a wireless communication channel.

In a feature, the anomaly detection module may be configured to detect whether at least some of the one or more events constitute an anomaly based on the predefined rules by determining whether a given network message associated with a given event is visible on a network of the vehicle. In one example of the foregoing feature, the anomaly detection module may be configured to detect an anomaly when the message is determined to be visible on the network of the vehicle. In one example of the foregoing feature, the anomaly detection module may be configured to detect the absence of an anomaly when the message is determined not to be visible on the network of the vehicle.

In another feature, each of the one or more network messages are associated with respective message IDs. In this feature, the anomaly detection module may be configured to detect whether at least some of the one or more events constitute an anomaly based on the predefined rules by determining whether any of the predefined rules correspond to a given message ID and, in response to determining that a predefined rule corresponds to the given message ID, comparing an allowed state associated with the predefined rule with a current state of the vehicle. In one example of the foregoing feature, the anomaly detection module may be configured to detect an anomaly when the current state of the vehicle does not correspond to the allowed state of the predefined rule. In another example of the foregoing feature, the anomaly detection module may be configured to detect the absence of an anomaly when the current state of the vehicle corresponds to the allowed state of the predefined rule.

In one feature, each of the one or more transmitted incident logs may include less metadata than its corresponding resident incident log.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Network policy rules may be defined using patterns associated with "bad" behaviors and potential threats, or by defining or learning statistically bounded "good" behaviors. In the context of transportation systems, an intrusion detection system (IDS) may be designed to identify abnormal in-vehicle network activity that may be indicative of performance "tuning" or the existence of a cyber-attack.

Figure 1:
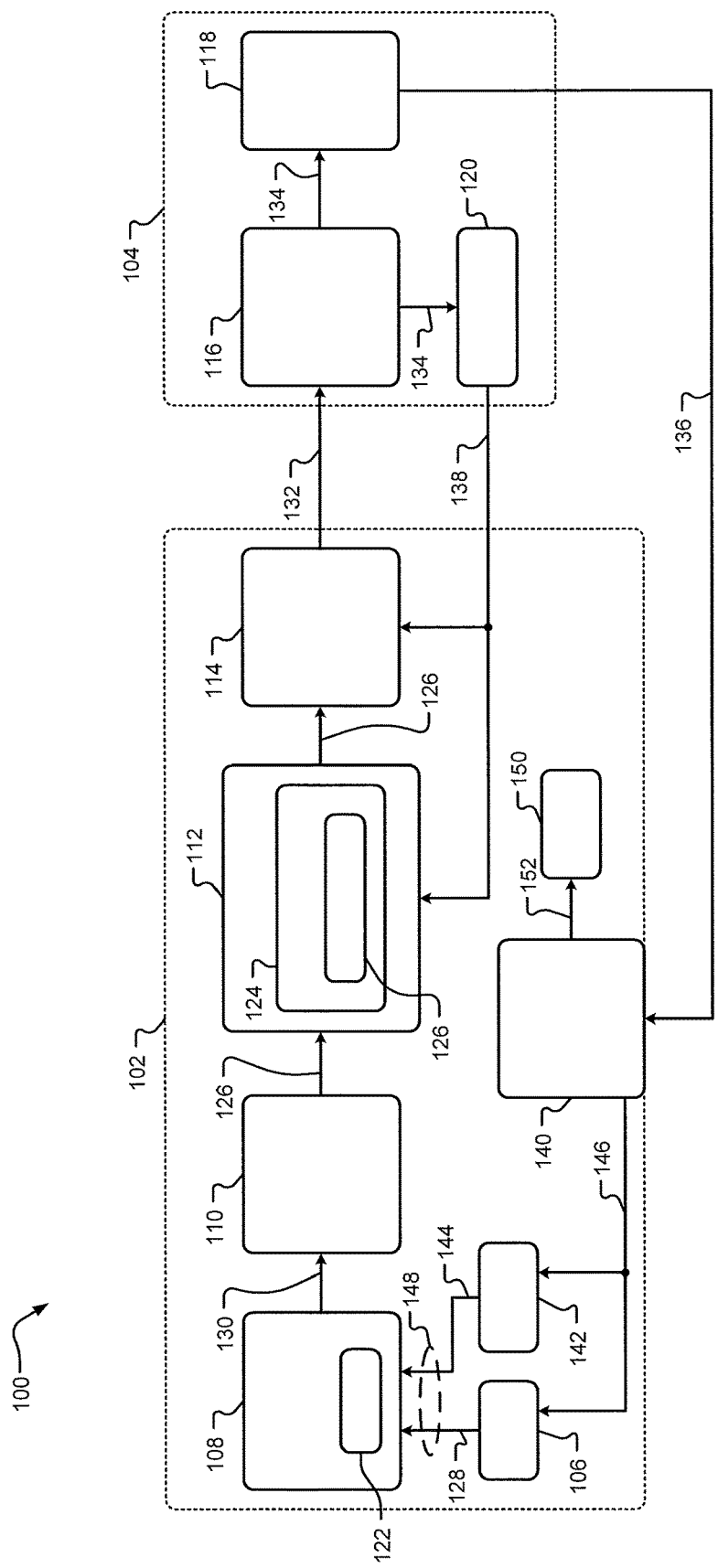
FIG. 1 is a functional block diagram illustrating an example of an intrusion detection system (IDS)

Referring now to FIG. 1, an IDS 100 is shown. The IDS 100 includes a vehicle 102 and a remote computing system 104. While the vehicle 102 may be any suitable type of vehicle, in the example of FIG. 1, the vehicle 102 constitutes an automobile. The vehicle 102 may be wirelessly connected to the remote computing system 104 via any suitable wireless network known in the art. In one example, the remote computing system 104 may be implemented by one or more server computers or the like.

In the example shown in FIG. 1, the vehicle 102 includes an anomaly detection module 108, a resident log generation module 110, an electronic control unit 112, a transmitted log generation module 114, one or more controller area network (CAN) busses 106, one or more Ethernet buses 142, a remedial action module 104, and a malfunction indicator light (MIL) 150. The remote computing system 104 includes an intrusion detection module 116, an intrusion response module 118, and a log control module 120.

In operation, the system 100 may function as follows to detect intrusions within a network of the vehicle 102. The anomaly detection module 108 of the vehicle 102 is configured to obtain (i.e., fetch or receive) one or more network messages 148 from one or more communication buses of the vehicle, such as the CAN bus(es) 106 and/or the ethernet bus(es) 142. The network message(s) 148 may include CAN messages 128 and/or Ethernet messages 144. The network message(s) 148 may describe one or more events associated with the vehicle. As used herein, an event may include any activity occurring within the vehicle's mechanical, electrical, or software systems. By way of example and not limitation, an event may include a mechanical malfunction, an electrical malfunction, the generation of a message, or any other activity that could potentially be indicative of an intrusion of the network of the vehicle 102. In one example, a mechanical malfunction could include faulty wiring in a vehicle.

In addition, the anomaly detection module 108 is configured to detect whether a least some of the one or more events constitute an anomaly based on predefined rules 122. An event may be detected to constitute an anomaly if it signals abnormal, unique, and/or unexpected activity occurring within the vehicle. The anomaly detection module 108 may detect whether a particular event constitutes an anomaly by comparing information describing the event with the predefined rules 122, which establish the boundaries for anomalous and non-anomalous behavior.

According to some examples, the predefined rules 122 may be based, at least in part, on operating state parameters of the vehicle 102. The operating state parameters may include, by way of example and not limitation, (i) speed of the vehicle 102; (ii) operation mode of the vehicle 102 (e.g., teen driver mode, etc.); (iii) power mode of the vehicle 102; (iv) state of a transmission gear selector (i.e., the "PRNDL") of the vehicle 102; and/or (v) presence of a test tool (e.g., presence of a diagnostic tool) in connection with the vehicle 102.

According to other examples, the predefined rules 122 may additionally, or alternatively, be based on one or more network design parameters associated with the vehicle. The network design parameters may include network ID, message transmission rate, assigned network(s) and/or message length.

In some implementations, the anomaly detection module 108 is configured to detect whether a given event constitutes an anomaly based on the predefined rules 122 by determining whether a given network message associated with a given event is visible on a network of the vehicle 102. If it is determined that the network message is indeed visible on the network of the vehicle, according to some examples, the anomaly detection module 108 may detect an anomaly. If it is determined that the network message is not visible on the network of the vehicle, according to some examples, the anomaly detection module 108 may detect the absence of an anomaly.

In some examples, each of the one or more network messages 148 is associated with a message ID and the anomaly detection module 108 is configured to detect whether a given event constitutes an anomaly based on the predefined rules 122 by determining whether any of the predefined rules 122 correspond to a given message ID. If a predefined rule does correspond to a given message ID, the anomaly detection module 108 is configured to compare an allowed state associated with the predefined rule with a current state of the vehicle 102. If the current state of the vehicle 102 does not correspond to the allowed state of the predefined rule, the anomaly detection module 108 may detect an anomaly. However, if the current state of the vehicle 102 corresponds to the allowed state of the predefined rule, the anomaly detection module 108 may detect the absence of an anomaly.

Figure 2:
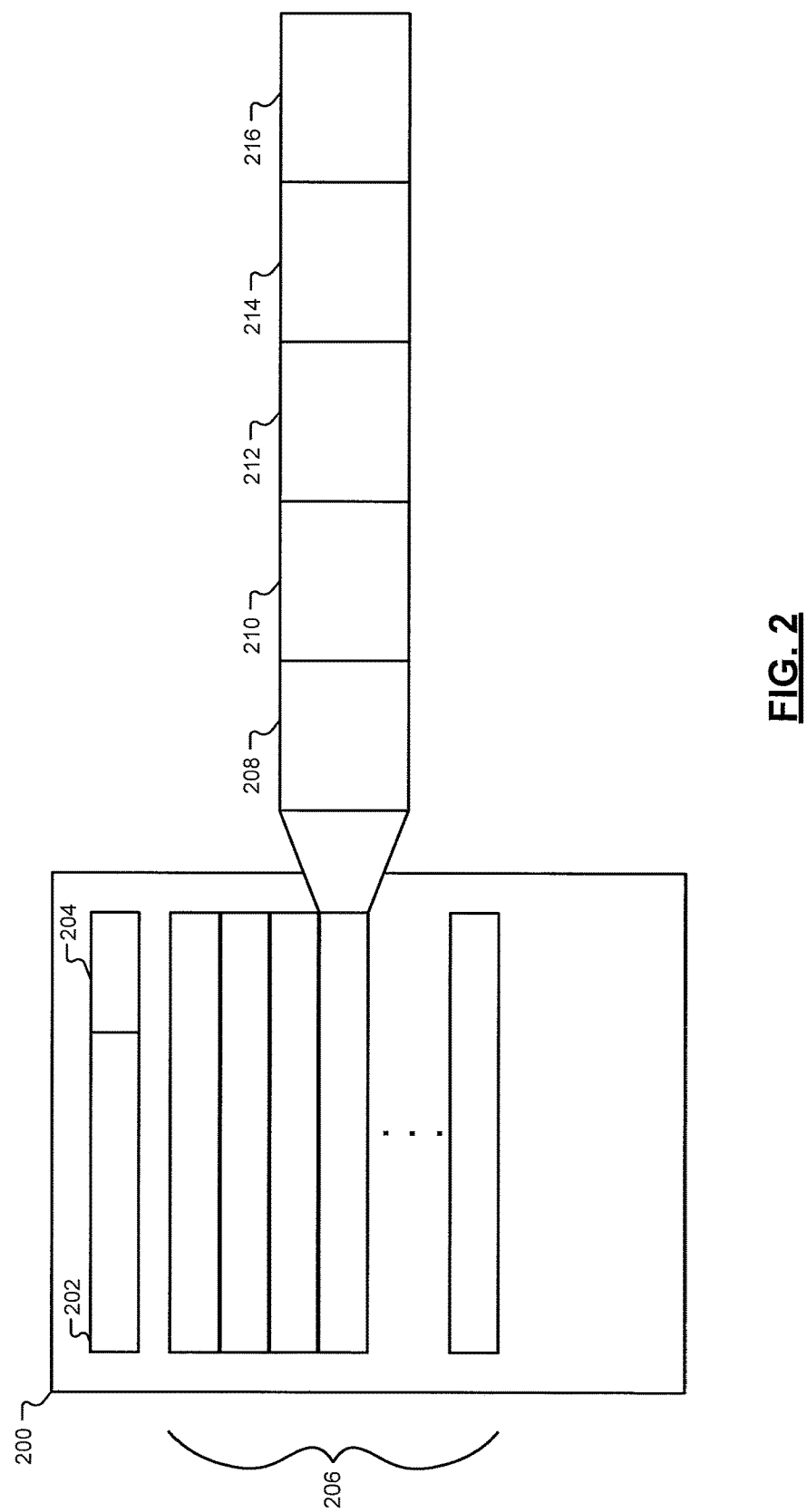
FIG. 2 is diagram illustrating an example data structure for a resident incident log and/or a transmitted incident log.
Figure 3:
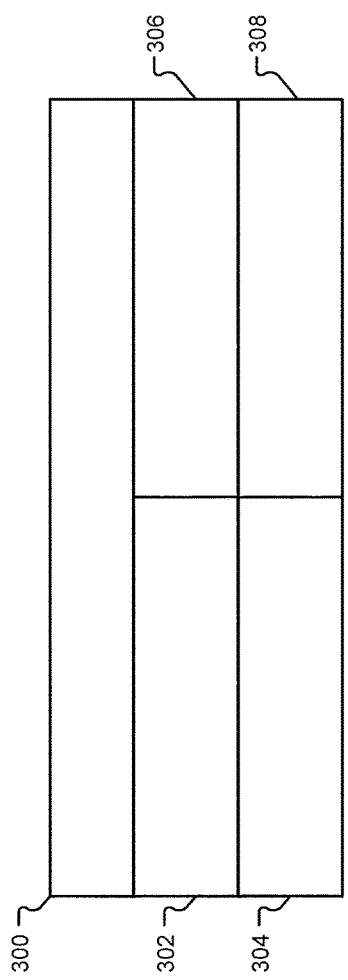
FIG. 3 is a diagram illustrating an example data structure for a manifest of a resident incident log.

Upon determining that some of the one or more events constitute an anomaly, the anomaly detection module 108 may generate anomaly event data 130 describing the anomalous events. The resident log generation module 110 may obtain the anomaly event data 130 for further processing. More specifically, the resident log generation module 110 may be configured to generate one or more resident incident logs 126 based on the detected anomaly event data 130. The resident incident log(s) 126 may include metadata associated with one or more detected anomalous events. The specific types of metadata included as part of a given resident incident log are illustrated in FIGS. 2-3 and discussed in additional detail below.

According to some implementations, the vehicle 102 may also include an electronic control unit (ECU) 112. The ECU may obtain the resident incident logs 126 from the resident log generation module 110, and store the resident incident logs 126 in memory 124. Although shown as a separate element from the anomaly detection module 108, resident log generation module 110, transmitted log generation module 1154, and remedial action module 140, according to some implementations, one or more of the foregoing modules 108, 110, 114, and 140 may be implemented as part of the ECU 112. For example, according to some implementations, the ECU 112 may include one or more microcontrollers configured to execute executable instructions stored in memory 124 to perform some or all of the functions ascribed to the modules 108, 110, 114, and 140.

The transmitted log generation module 114 is configured to obtain the resident incident log(s) 126 from the ECU 112 and generate one or more transmitted incident logs 132 based on the resident incident log(s). Each individual transmitted incident log may correspond to a resident incident log. A given transmitted incident log may correspond to a given resident incident log in that the transmitted incident log will include some or all of the metadata included as part of the resident incident log. In some implementations, a given transmitted incident log may include less metadata than its corresponding resident incident log. In this manner, data transmission costs associated with transmitting the transmitted incident log(s) from the vehicle 102 to the remote computing system 104 may be minimized. According to some implementations, the amount of common data that a transmitted incident log shares with its corresponding resident incident log may vary based on, for example, commands issued from the remote computing system 104, as discussed in additional detail below. In some examples, a given transmitted incident log may include all of the metadata included within its corresponding resident incident log.

The transmitted incident log generation module is further configured to transmit the transmitted incident log(s) 132 to the remote computing system 104 for further processing.

The intrusion detection module 116 of the remote computing system 104 is configured to obtain the transmitted incident log(s) 132 from the transmitted incident log generation module 114 of the vehicle 102. Once the transmitted incident log(s) 132 are obtained, the intrusion detection module 116 is configured to determine whether an intrusion has occurred within the vehicle's network based on the transmitted incident log(s) 132. According to some examples, the intrusion detection module 116 may utilize a rules-based approach to performing intrusion detection, whereby the transmitted incident log(s) 132 are analyzed in accordance with predefined rules and/or policies to detect an intrusion. According to other examples, the intrusion detection module 116 may employ supervised or unsupervised machine-learning techniques to detect intrusions based on the transmitted incident log(s) 132.

Upon detecting an intrusion, the intrusion detection module 116 is configured to generate intrusion detection data 134. The intrusion detection data 134 includes data describing the nature of the intrusion. The intrusion detection module 116 is further configured to transmit the intrusion detection data 134 to the intrusion response module 118 and the log control module 120 for further processing.

The intrusion response module 118 is configured to obtain the intrusion detection data 134 and generate an intrusion response command 118 in response thereto. The intrusion response command 136 is configured to instruct the vehicle to take some affirmative action to resolve or mitigate the effects of the detected intrusion.

The remedial action module 140 of the vehicle is configured to obtain the intrusion response command 136 and effectuate some remedial action in response thereto. More specifically, the remedial action module 140 may, for example, restrict communications from one or more communication buses (e.g., one or more CAN buses or one or more Ethernet buses) or cause the illumination of a malfunction indicator light (MIL) 150.

The log control module 120 is configured to obtain the intrusion detection data 134 and generate a log control command 138 in response thereto. The log control command 138 is configured to instruct the vehicle to define and/or modify the manner in which resident incident log(s) 126 and/or transmitted incident log(s) 132 are stored, generated, transmitted, etc.

According to some implementations, the ECU 112 is configured to obtain the log control command 138 and take one or more of the following actions in response: (i) erase from memory 124 at least one resident incident log of the one or more resident incident logs 126 and/or (ii) adjust a memory allocation within memory 124 for at least one of the one or more resident incident logs 126.

According to some examples, the transmitted log generation module 114 is configured to obtain the log control command 138 and take one or more of the following actions in response: (i) transmit at least one of the one or more resident incident logs 126 to the remote computing system 104; (ii) adjust the content of at least one of the one or more resident incident logs 126 prior to transmission to the remote computing system 104; (iii) adjust a log transmission rate associated with the transmitted log generation module 114, whereby the log transmission rate describes a frequency at which transmitted incident logs 132 are transmitted from the transmitted log generation module 114 to the remote computing system 104; and/or (iv) restrict a data size of one or more of the transmitted incident logs 132.

Referring now to FIG. 2, an example data structure 200 for a resident incident log and/or a transmitted incident log is shown. According to some examples, resident incident logs and transmitted incident logs may have generally the same data structure. However, in many instances, transmitted incident logs will include less data than their corresponding resident incident logs for, among other reasons, mitigating expenses associated with transmitting information over one or more wireless networks to a remote computing system. The data structure 200 includes a manifest 202 with a cyclic redundancy check (CRC) 204 and an incident log 206 including one or more incident log entries. The manifest 202 may include details of the data structure 200 as well as details concerning whether a new event occurred. The CRC 204 may include a check value attached based on the remainder of a polynomial division of their contents, allowing some or all of the data structure 200 to be recovered if errors are introduced during transmission of the data structure 200. Each incident log entry may include details concerning a violation of one or more predefined rules (e.g., the predefined rules 122 of FIG. 1).

Each incident log entry may include a violated rule ID 208, a total violations counter 210, a timeframe violation occurred 212, a network message that violated the rule 214, and historical data 216. The violated rule ID 208 portion of a given incident log entry may include an identification of a particular rule that was violated from among a plurality of rules that collectively constitute a rules policy. The total violations counter 210 portion of a given incident log entry may include a counter representing the number of times that the rule at issue has been violated. The timeframe violation occurred 212 portion of a given incident log entry may include both (i) a first timestamp (e.g., in Coordinated Universal Time (UTC) format) indicating a first time that the rule violation occurred and (ii) a second timestamp (e.g., in UTC format) indicating a most recent time that the rule violation occurred. The network message that violated the rule 214 portion of a given incident log entry may include an identification (e.g., a message ID) indicating particular network message that violated the rule at issue. Finally, the historical data 216 portion of a given incident log entry may include information providing a historical timeline for the rule violation at issue including, but not limited to, (1) a network message timestamp providing an indication of a time that the rule at issue was violated, (2) a message ID identifying the network ID where the message at issue was seen on the vehicle's network, and (3) message vehicle state information including vehicle state parameters at the time that the rule at issue was violated.

FIG. 3 illustrates one example of a data structure for a resident incident log manifest 300. The resident incident log manifest 300 includes a ruleset 302, and newly logged event highlights 306. The ruleset 302 includes a soft-part reference number 304. The soft-part reference number 304 identifies a rule set to which the resident incident log corresponds. In an example where the rule set constitutes a calibration-based rule set, the soft-part reference number 304 may include an associated calibration file part number. In an example where the rule set constitutes a data complied into application code-based rule set, the soft-part reference number 304 may include a reference to the relevant application code part number. The newly logged event highlights 306 include a total rule violations 308 portion. The total rule violations 308 includes a summary of the total number of incidents logged for all rule violations within a given rule set defined by the soft-part reference number 304.

Figure 4:
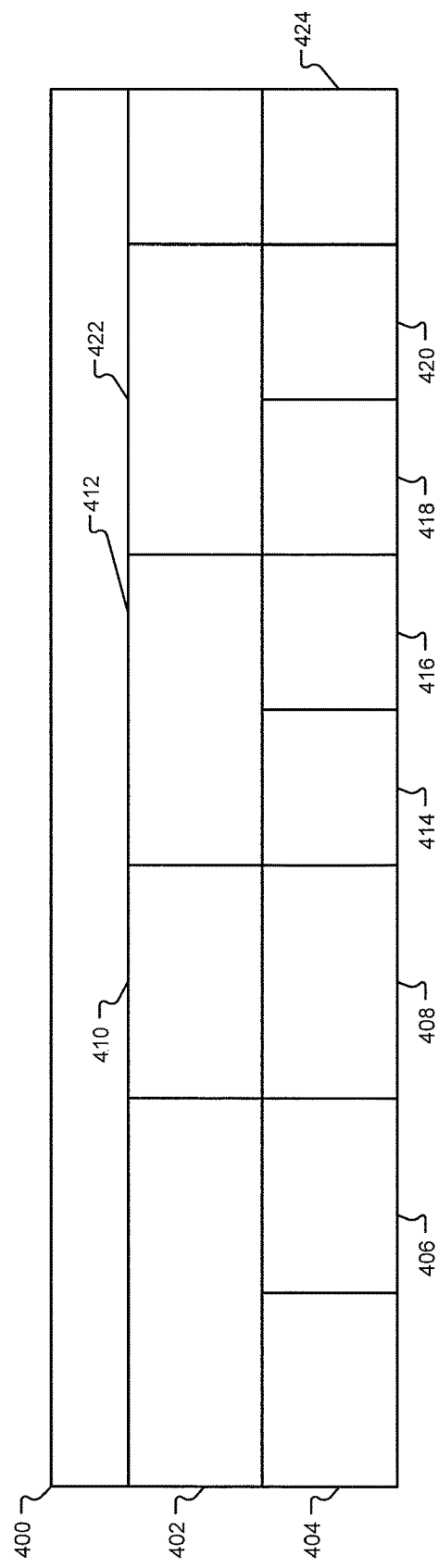
FIG. 4 is a diagram illustrating an example data structure for a manifest of a transmitted incident log.

FIG. 4 illustrates one example of a data structure for a transmitted incident log manifest 400. The transmitted incident log manifest 400 includes a log type identifier 402, a ruleset 410, a time window 412, a vehicle identifier 422, and a CRC 424.

The log type identifier 402 includes message type information 404 and log format information 406. The message type information 404 includes an identification of a function of a given message. According to some examples, the message type 404 may indicate the message at issue as being (i) reserved, (ii) reflecting an incident log from a particular core of a particular microcontroller, (iii) reflecting a non-incident log (e.g., a message) from a particular core of a particular microcontroller or, more broadly, as simply emanating from a particular microcontroller, (iv) reflecting a non-incident log (e.g., a message) from a remote computing system remote from the vehicle, and (v) reflecting a health-status log. The log format information 406 defines a format for data included within the message.

The ruleset 410 includes a soft-part, part number 408. The soft-part, part number 408 identifies a rule set to which the transmitted incident log corresponds. In an example where the rule set constitutes a calibration-based rule set, the soft-part, part number 408 may include an associated calibration file part number. In an example where the rule set constitutes a data complied into application code-based rule set, the soft-part, part number 408 may include a reference to the relevant application code part number.

The time window 412 includes a StartRecord time 414 and a Next StartRecord time 416. The StartRecord time 414 may include a timestamp (e.g., in UTC format) providing an indication of the start point for the transmitted incident log. The Next StartRecord time 416 may include a timestamp (e.g., in UTC format) providing an indication of the start point for the next transmitted incident log scheduled for transmission to the remote computing system.

The vehicle identifier 422 includes a VIN number 418 and a Unique ID number 420. The VIN number 418 identifies the vehicle that transmitted the transmitted incident log to which the manifest 400 pertains. The Unique ID number 420 identifies an ECU of the vehicle that transmitted the transmitted incident log to which the manifest 400 pertains.

Finally, the CRC 424 may include a check value attached based on the remainder of a polynomial division of their contents, allowing some or all of the transmitted incident log manifest 400 to be recovered if errors are introduced during transmission of the manifest 400.

Figure 5:
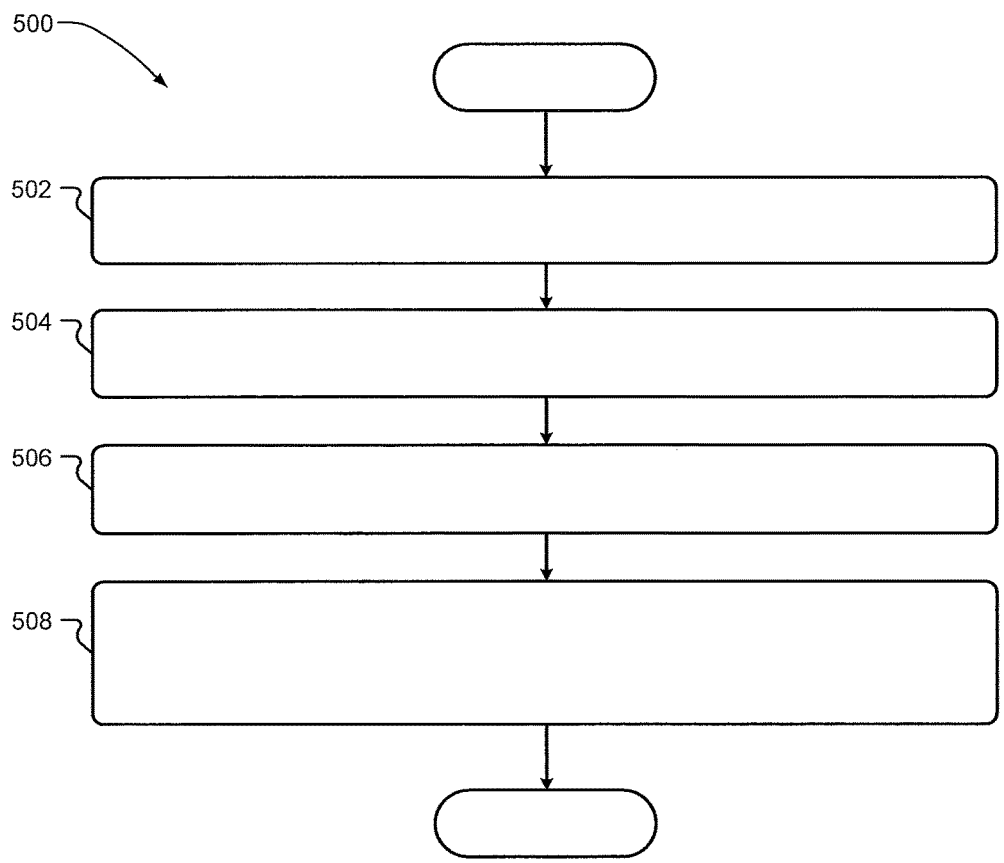
FIG. 5 is a flowchart illustrating an example method for generating a transmitted incident log.

Referring now to FIG. 5, a flowchart is provided illustrating a method 500 for generating a transmitted incident log according to examples provided herein. The method 500 begins at 502 where one or more messages are obtained from one or more communication buses of a vehicle. The one or more messages may describe one or more events associated with the vehicle. At 504, the method 500 involves detecting whether at least some of the event(s) constitute an anomaly based on predefined rules to provide detected anomaly event data. At 506, one or more resident incident logs are generated based on the detected anomaly event data. The one or more resident logs may include metadata associated with detected anomalous events. Finally, at 508, one or more transmitted incident logs are generated based on the resident incident log(s). Each of the transmitted incident log(s) may correspond to a resident incident log. In addition, according to some implementations, each of the one or more transmitted incident logs may include less metadata than its corresponding resident incident log. Following 508, the method concludes.

Figure 6:
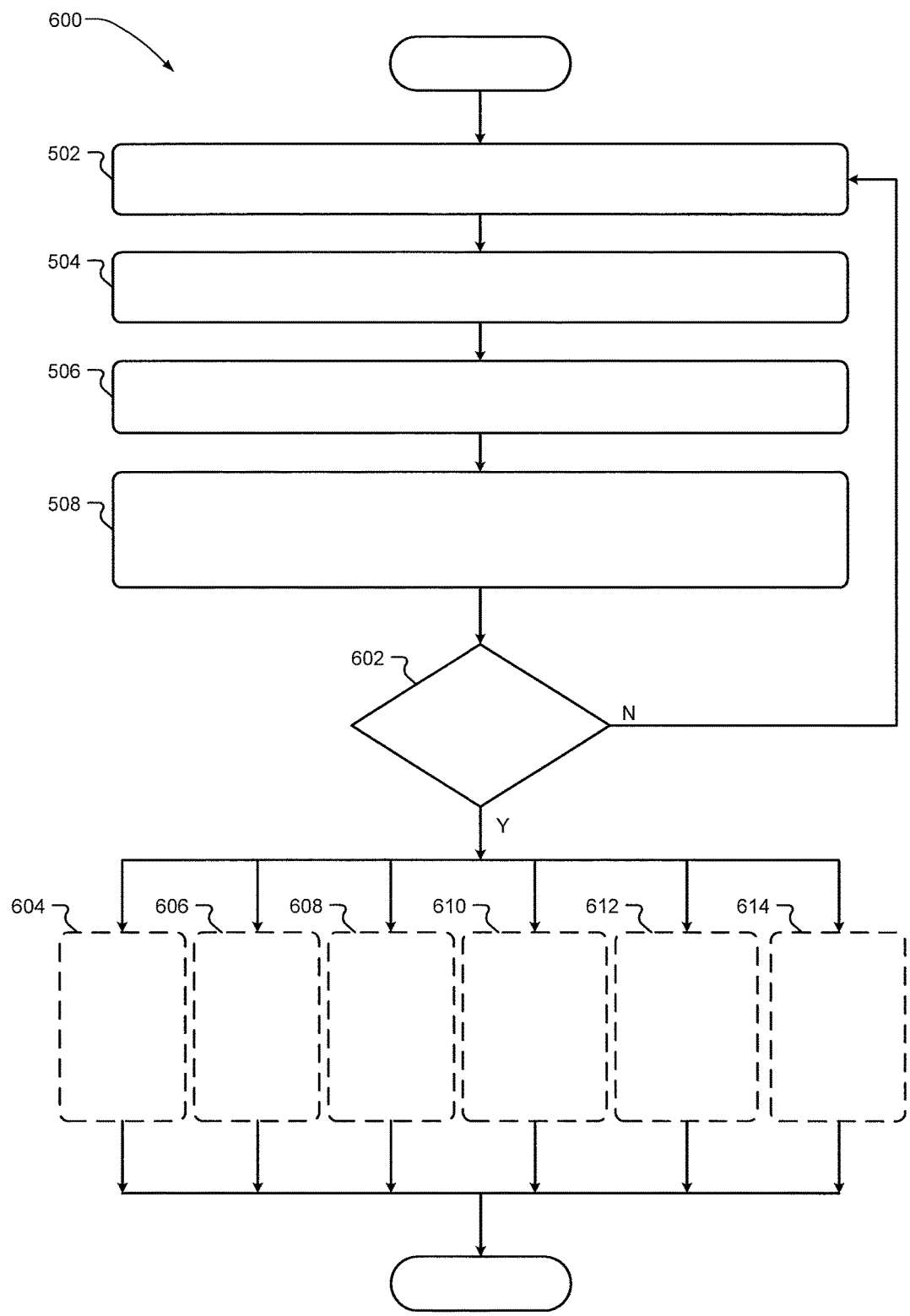
FIG. 6 is a flowchart illustrating an example method for controlling the administration of incident logs.

Referring now to FIG. 6, a flowchart is provided illustrating a method 600 for controlling the administration of incident logs. The method 600 begins at 502. Steps 502 through 508 are carried out in substantially the same fashion as described with regard to FIG. 5. Thus, beginning at step 602, the method 600 includes determining whether a log control command has been obtained. According to one example, the log control command may be transmitted from the remote computing system to the vehicle to control administration of incident logs. If a log control command has not been obtained, the method 600 proceeds back to 502 and steps 502 through 508 may repeat. If, however, a log control command has been obtained, the method 600 may proceed to one or more of 604, 606, 608, 610, 612, and 614 for further processing.

Following 602, one or more of the actions set forth at 604, 606, 608, 610, 612, and 614 may be performed. In addition, the one or more actions may be performed serially, or in parallel. The actions set forth at 604, 606, 608, 610, 612, and 614 may represent, for example, various options available to a vehicle upon the vehicle obtaining a control command from the remote computing system. At 604, one or more resident incident logs may be erased from memory (e.g., a volatile or non-volatile memory of the vehicle). At 606, a memory allocation may be adjusted for the one or more resident incident logs. According to one example, adjusting a memory allocation may include altering where one or more resident incident logs are stored in physical or virtual memory. At 608, one or more resident incident logs or transmitted incident logs may be transmitted from the vehicle to the remote computing system. At 610, content of one or more resident incident logs or transmitted incident logs may be adjusted prior to transmission from the vehicle to the remote computing system. At 612, a log transmission rate may be adjusted. The log transmission rate may describe a frequency at which transmitted incident logs are transmitted from the vehicle to the remote computing system. Finally, at 614, a data size of one or more transmitted incident logs may be restricted. Following any, some, or all of 604, 606, 608, 610, 612, and 614 being performed, the method 600 concludes.

Figure 7:
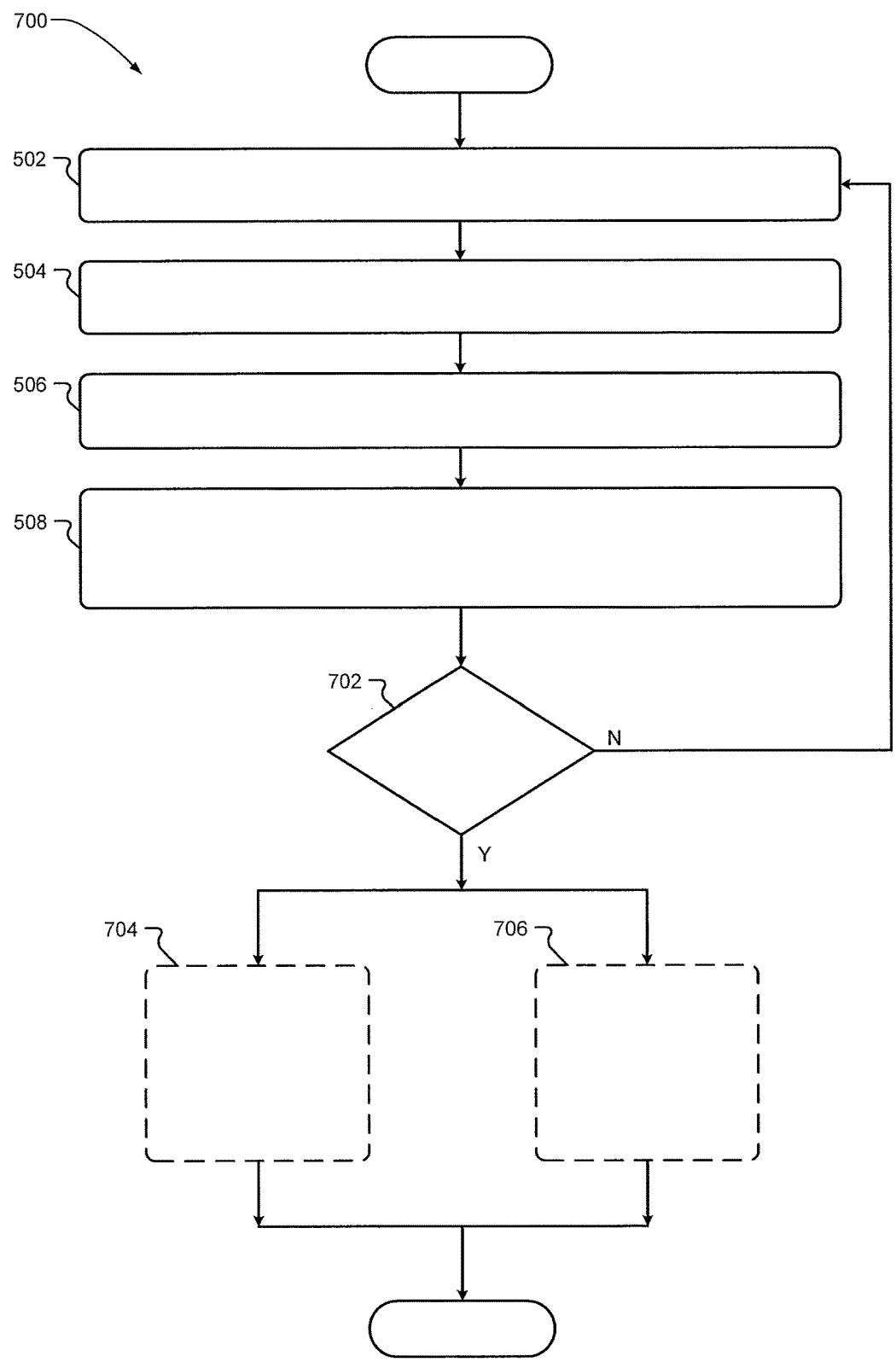
FIG. 7 is a flowchart illustrating an example method for taking remedial action in response to detecting an intrusion within an in-vehicle network.

Referring now to FIG. 7, a flowchart is provided illustrating a method 700 for taking remedial action in response to detecting an intrusion within an in-vehicle network. The method 700 begins at 502. Steps 502 through 508 are carried out in substantially the same fashion as described with regard to FIG. 5. Thus, beginning at step 702, the method 700 includes determining whether an intrusion response command has been obtained, for example, by the vehicle form the remote computing system. If an intrusion response command has not been obtained, the method 700 proceeds back to 502 and steps 502 through 508 may repeat. If, however, an intrusion response command has been obtained, the method 700 may proceed to 704 and/or 706 for further processing.

Following 702, one or more of the actions set forth at 704 and 706 may be performed serially or in parallel. The actions set forth at 704 and 706 may represent, for example, various options available to a vehicle upon the vehicle obtaining an intrusion response command from the remote computing system. At 704, communications may be restricted from one or more communication buses (e.g., CAN bus(es) and/or Ethernet bus(es)) of the vehicle. At 706, a malfunction indicator light (MIL) may be illuminated. The illuminated MIL light may, for example, signal to a vehicle occupant that there is a problem with the vehicle (e.g., a network intruder) requiring attention. Following 704 and/or 706, the method 700 concludes.

Figure 8:
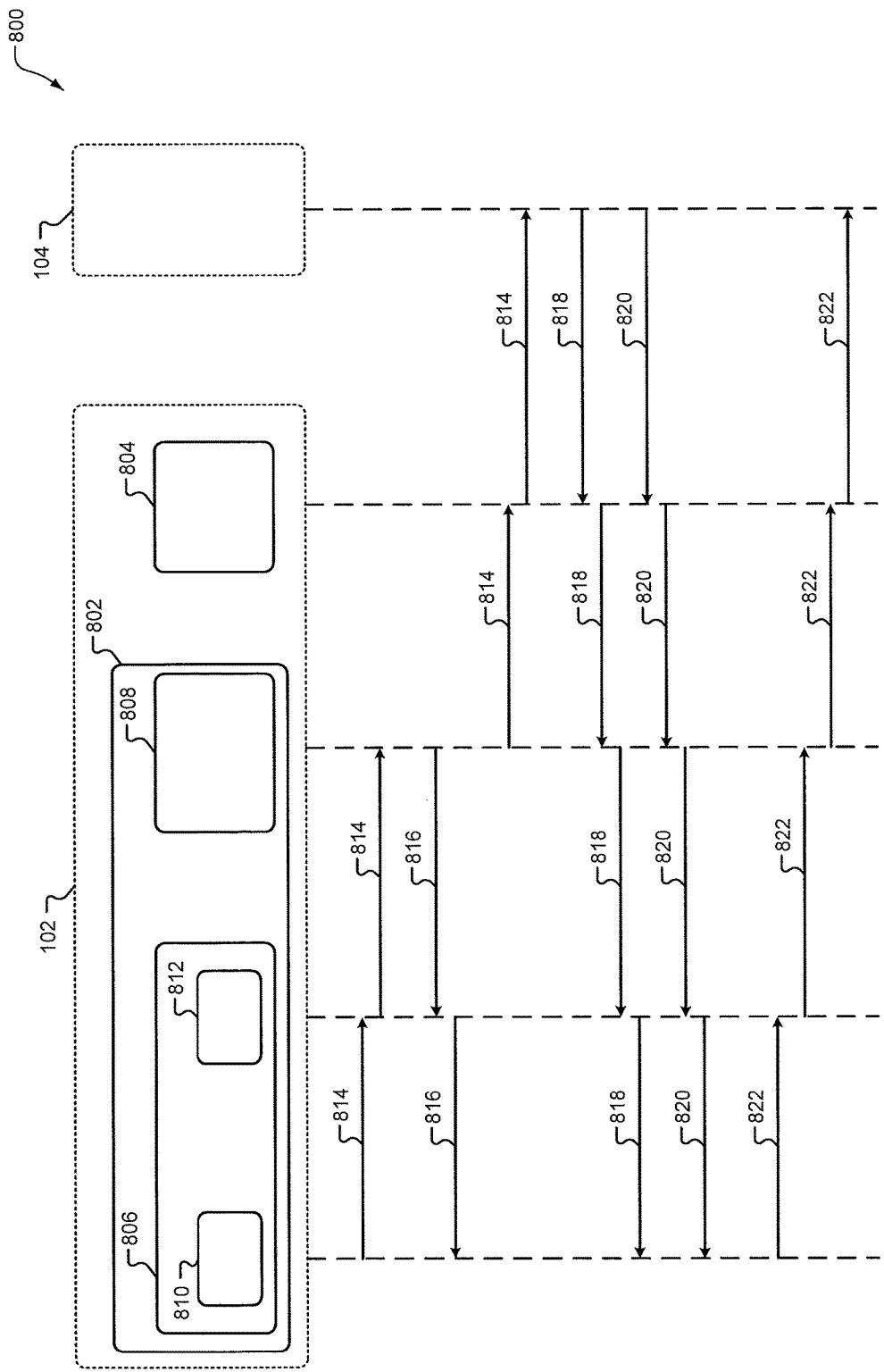
FIG. 8 is a functional block diagram illustrating a system and corresponding communications protocol for performing in-vehicle network intrusion detection.

Turning now to FIG. 8, a system 800 and associated communications protocol for communicating between the vehicle 102 and remote computing system 104 is shown. The vehicle 102 and remote computing system 104 may be substantially similar to the vehicle 102 and remote computing system 104 shown and described with regard to FIG. 1 above. The example vehicle 102 of FIG. 8 differs from the example vehicle of FIG. 1 in that the vehicle 102 of FIG. 8 is shown including a central gateway module (CGM) 802 and wireless transmitter 804. The CGM 802 may include a first microcontroller 802 and a second microcontroller 808. In addition, the first microcontroller 806 of the CGM 802 may include a second core 810 and a first core 812. According to some example implementations, the second core 810 and first core 812 may access a shared, secured memory (not shown) used for, among other things, the generation, storage, and transmission of resident incident logs and/or transmitted incident logs.

The second microcontroller 808 may be communicatively connected to the wireless transmitter 804 via one or more suitable wired or wireless communication channels. Similarly, the second microcontroller 808 may be communicatively connected to the first microcontroller 806 via one or more suitable wired or wireless communication channels. The wireless transmitter 804 is configured to communicate with the remote computing system 104 over one or more wireless communication networks using one or more suitable communication protocols (e.g., VCP/TCP, etc.).

According to some example implementations, the components of the system 800 may communicate between one another as follows. At 814, the second core 810 of the first microcontroller 806 may generate and transmit a transmitted incident log to the first core 812 of the first microcontroller 806. The first core 812 of the first microcontroller 806 may then forward the transmitted incident log 814 along to the second microcontroller 808. Upon receiving the transmitted incident log 814, the second microcontroller 808 may (i) generate an acknowledgement 816 acknowledging successful receipt of the transmitted incident report 814; (ii) transmit the acknowledgement 816 to the first core 812 of the first microcontroller 806; and (iii) forward the transmitted incident report 814 along to the wireless transmitter 804. Upon receiving the acknowledgment 816, the first core 812 may forward the acknowledgment 816 along to the second core 810 of the first microcontroller 806.

The wireless transmitter 804 may receive the transmitted incident log 814 from the second microcontroller 808 and forward the same 814 along to the remote computing system 104 over one or more wireless networks. Upon receiving the transmitted incident log 814 from the wireless transmitter 804 of the vehicle 102, the remote computing system 104 may (i) generate an acknowledgement 818 acknowledging successful receipt of the transmitted incident report 814; (ii) transmit the acknowledgement 818 to the wireless transmitter 804 of the vehicle 102; (iii) generate a command 820; and transmit the command 820 to the wireless transmitter 804 of the vehicle 102. The command 820 may include at least one of a log control command and an intrusion response command. Both the acknowledgement 818 and command 820 may be forwarded back up-stream from the remote computing system 104 to the second core 810 via intermediaries including the wireless transmitter 804, second microcontroller 808, and first core 812 of the first microcontroller 806.

Upon receiving the command 820, the second core 810 of the first microcontroller may (i) generate an acknowledgement 822 acknowledging successful receipt of the command 820 and (ii) transmit the acknowledgement 822 to the first core 812. The first core 812 may then forward along the acknowledgment 822 to the remote computer system 104 via intermediaries including the second microcontroller 808 and wireless transmitter 804.

The system 800 and communication protocol discussed above with regard to FIG. 8 offers several advantages in the context of in-vehicle network intrusion detection. Firstly, the architecture of the system 800 allows for the isolation of certain intrusion detection functions (such as anomaly detection) from network connectivity to reduce the likelihood of a direct, remote attack. For example, according to one implementation, anomaly detection and resident incident log/transmitted incident log generation may be accomplished by the second core 810, which may be communicatively isolated from direct off-vehicle communications through intermediary components such as the second microcontroller 808 and wireless transmitter 804. Moreover, according to some example implementations, the first microcontroller 806 is not provided with a network stack capable of transmitting incident logs (e.g., transmitted incident logs) directly to the remote computing system 104. This may reduce the complexity and expense of the first microcontroller 806. Rather, the second microcontroller 804 may be the lone microcontroller included as part of the CGM 802 that includes a network stack capable of transmitting incident logs to the remote computing system 104 (e.g., via the wireless transmitter 804). Failure to isolate the first microcontroller 806 could potentially open both gating and anomaly detection functionalities to the possibility of direct remote attacks. Further still, the use of acknowledgements (e.g., acknowledgements 818, 818, 822, etc.) improves the reliability of the system by ensuring that communications (e.g., transmitted incident logs) reach their intended destination. Thus, the architecture and communications protocol disclosed with regard to FIG. 8 may provide an end-to-end communications system 800 that, according to some examples, ensures that a specific communications path is used at Layer 4 of the Open Systems Interconnection (OSI) model, whereas other systems may only ensure that a reliable path is used from among a variety of options (which, is normally handled at Layer 2 of the OSI model).

Figure 9:
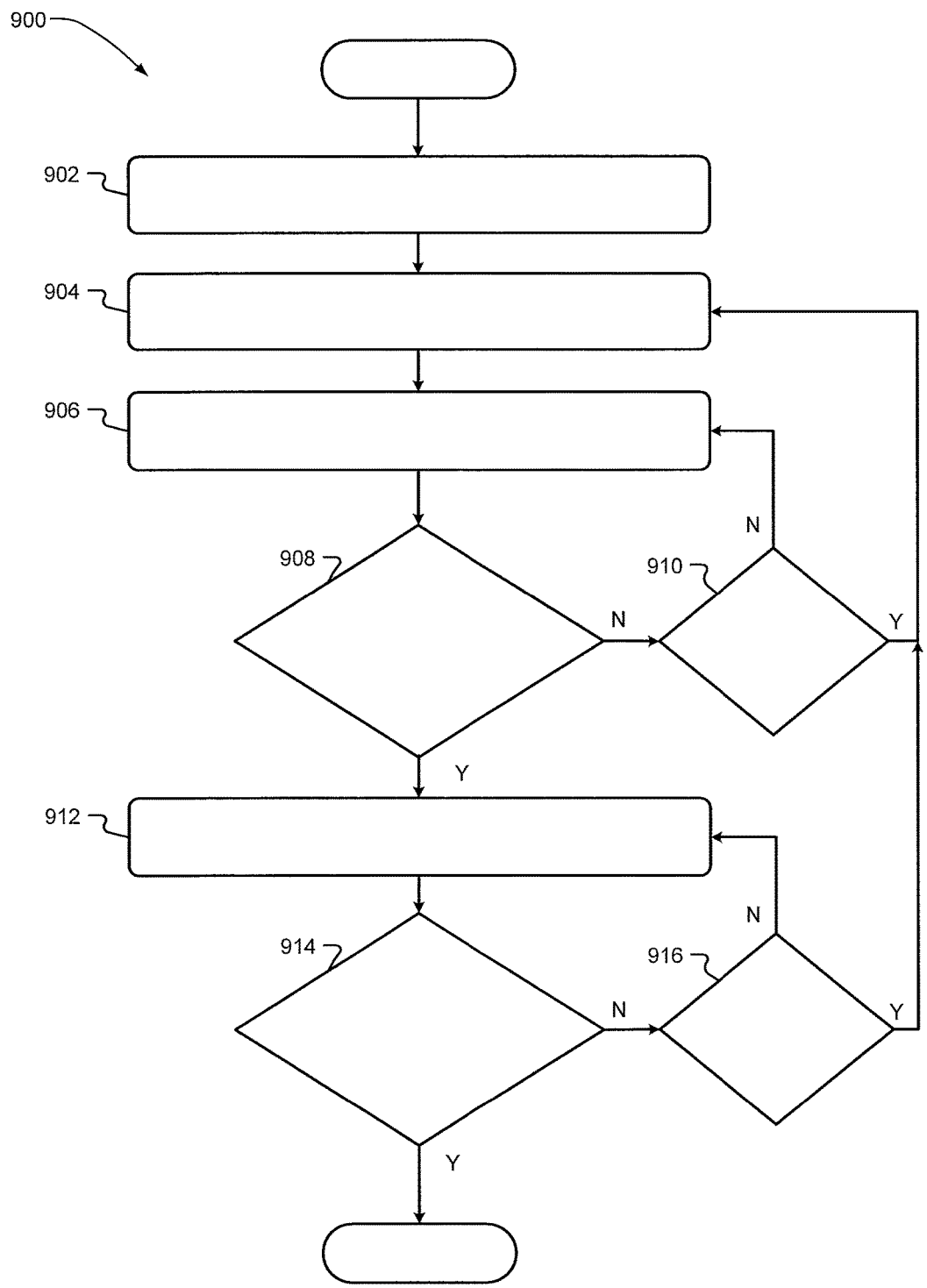
FIG. 9 is a flowchart illustrating an example method for communicating between a vehicle and a remote computing system to perform in-vehicle network intrusion detection.

Referring now to FIG. 9, a flowchart illustrating a method 900 for communicating between a vehicle and a remote computing system for purposes of providing in-vehicle network intrusion is provided. The method 900 begins at 902 where a transmitted incident is generated in a first microcontroller. At 904, the transmitted incident log is transmitted from the first microcontroller to the second microcontroller. At 906, the first microcontroller waits for an acknowledgment from the second microcontroller that the transmitted incident log was received. At 908, a determination is made as to whether the acknowledgement was received by the first microcontroller from the second microcontroller.

If an acknowledgment was not received, the method 900 proceeds to 910 and a determination is made as to whether or not a timeout has occurred (i.e., whether a predetermined amount of time has lapsed following transmission of the transmitted incident log from the first microcontroller to the second microcontroller). If a timeout has occurred, the method 900 proceeds back to 904 and the transmitted incident log is retransmitted from the first microcontroller to the second microcontroller. If a timeout has not occurred, the method 900 proceeds back to 906 and the first microcontroller waits for an acknowledgement from the second microcontroller.

If, at 908, an acknowledgment was received by the first microcontroller from the second microcontroller, the method 900 proceeds to 912. At 912, the second microcontroller waits for an acknowledgement from the remote computing system (e.g., an acknowledgement that the remote computing system received the transmitted incident log as transmitted from the second microcontroller to the first microcontroller (step not shown in FIG. 9)). At 914, a determination is made as to whether the acknowledgment was received by the second microcontroller from the remote computing system.

If an acknowledgment was not received, the method 900 proceeds to 916 and a determination is made as to whether or not a timeout has occurred (i.e., whether a predetermined amount of time has lapsed following transmission of the transmitted incident log from the second microcontroller to the remote computing system). If a timeout has occurred, the method 900 proceeds back to 904 and the transmitted incident log is retransmitted from the first microcontroller to the second microcontroller. If a timeout has not occurred, the method 900 proceeds back to 912 and the second microcontroller waits for an acknowledgement from the remote computing system. Following 914, the method 900 concludes.

Figure 10:
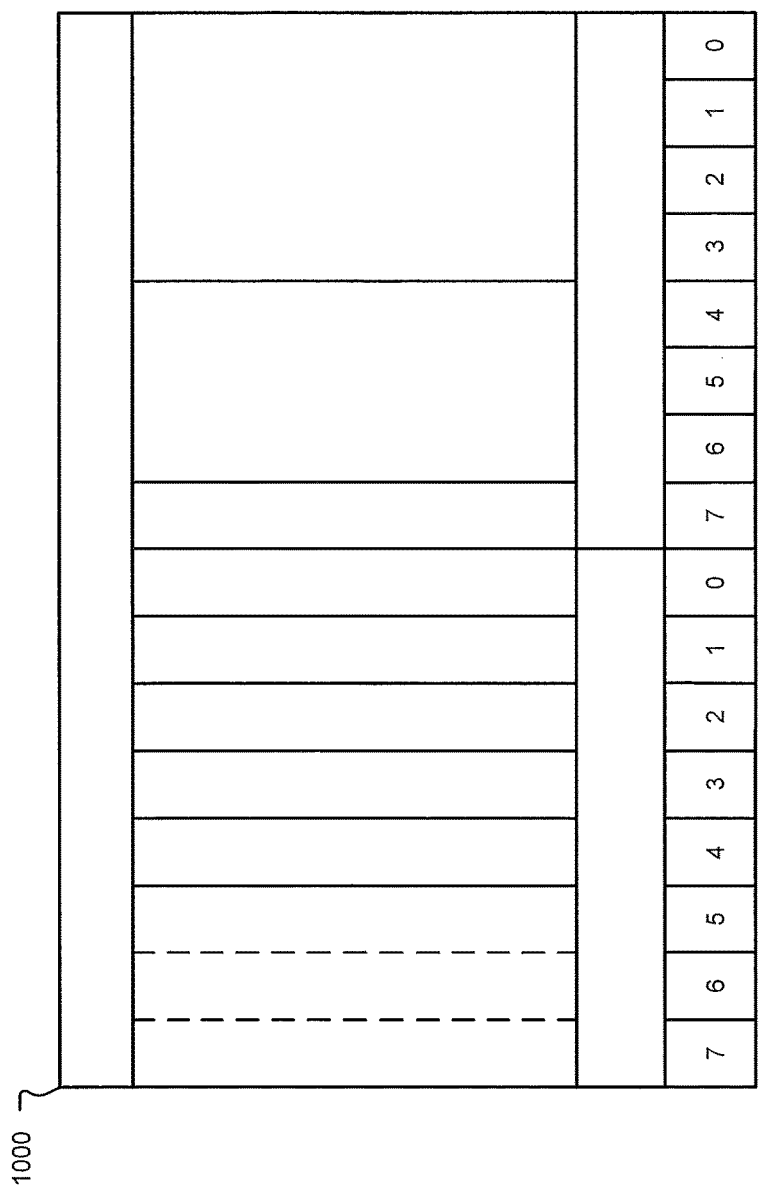
FIG. 10 is an example data structure for a memory storing vehicle operating state parameters.

FIG. 10 illustrates an example data structure 1000 for a memory storing vehicle operating state parameters. According to some examples, the data structure 1000 may be stored in one or more registers accessible by component(s) of the intrusion detection system that perform anomaly detection (e.g., the anomaly detection module 108 of FIG. 1, the first microcontroller 806 of FIG. 8, etc.). In this way, vehicle operating state parameters may be considered in determining whether any of the predefined rules considered as part of anomaly detection have been violated. As shown, the data structure 1000 may reserve bits and/or bytes of data to express the following types of information concerning the state of a vehicle: (i) whether a presentation capability is active; (ii) whether Driver Mode A or Driver Mode B is active; (iii) whether teen driver mode is active; (iv) whether a test tool is presently connected to the vehicle; (v) a CGM security access status; (vi) vehicle speed; (vii) vehicle power mode; and (viii) state of a transmission gear selector (i.e., "PRNDL" state).

Consideration of the foregoing vehicle operating state parameters may assist in anomaly detection by providing context surrounding potential rule violations, allowing for an improved classification of network events. According to some implementations, anomaly detection may incorporate Boolean operations (e.g., AND/OR operations) to define flexible logical expressions that are capable of incorporating network messages with performance design parameters, message payload, vehicle operating state conditions, frequency of occurrence, and a network response with elements not desired in defining an expression being ignored by an appropriate notation within the complete logical expression.

Among other advantages, the incorporation of operating state parameters of a vehicle in performing anomaly detection may include (i) the ability to reduce the number of false positives that could be generated (i.e., a detection of an anomalous event when the event was not actually anomalous, or did not actually signify an intrusion) and (ii) the generation of network intrusion rules capable of placing normal behaviors in context of abnormal use to support anti-vehicle theft and fraud initiatives.

Figure 11:
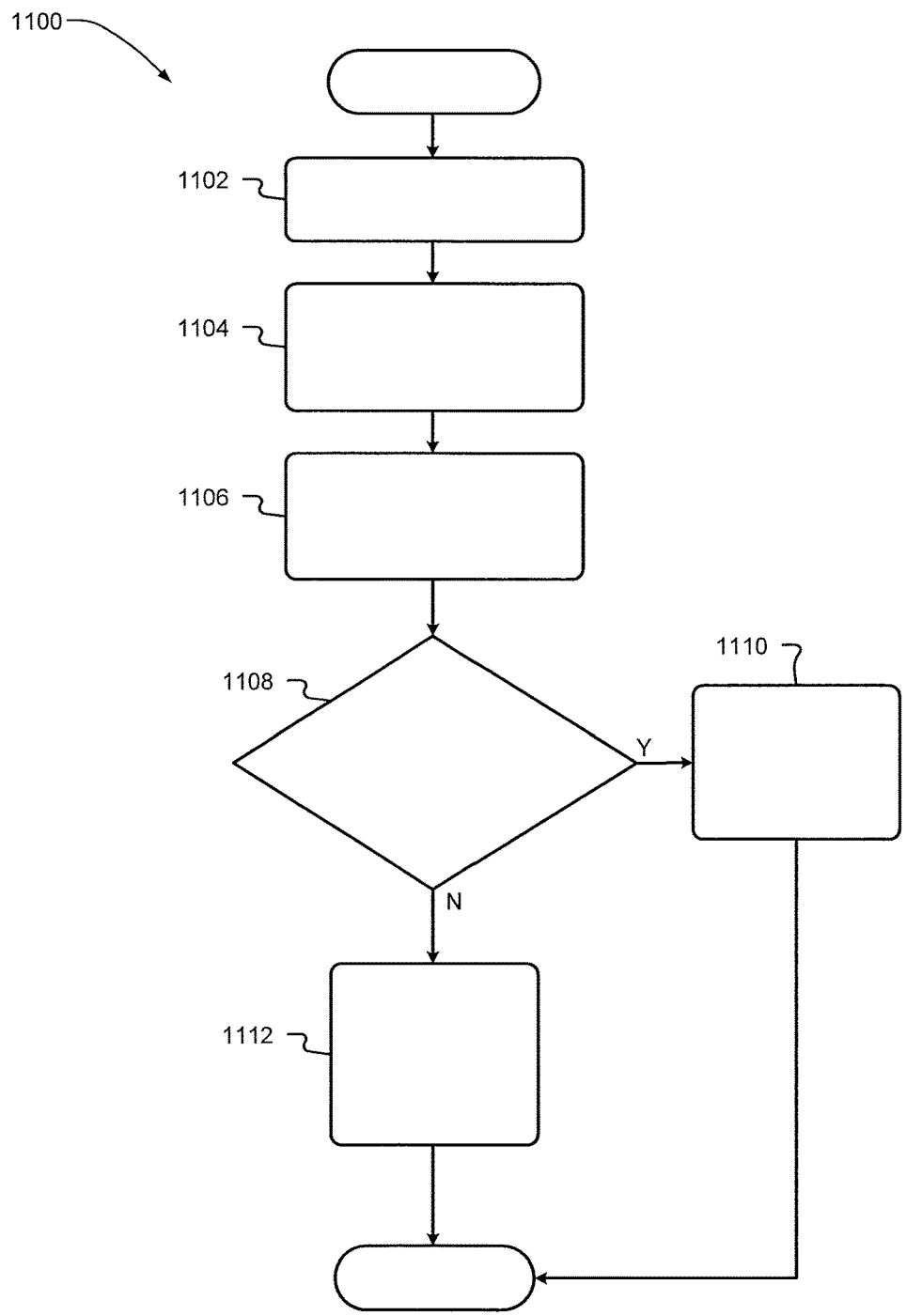
FIG. 11 is a flowchart illustrating a method for performing anomaly detection.
Figure 12:
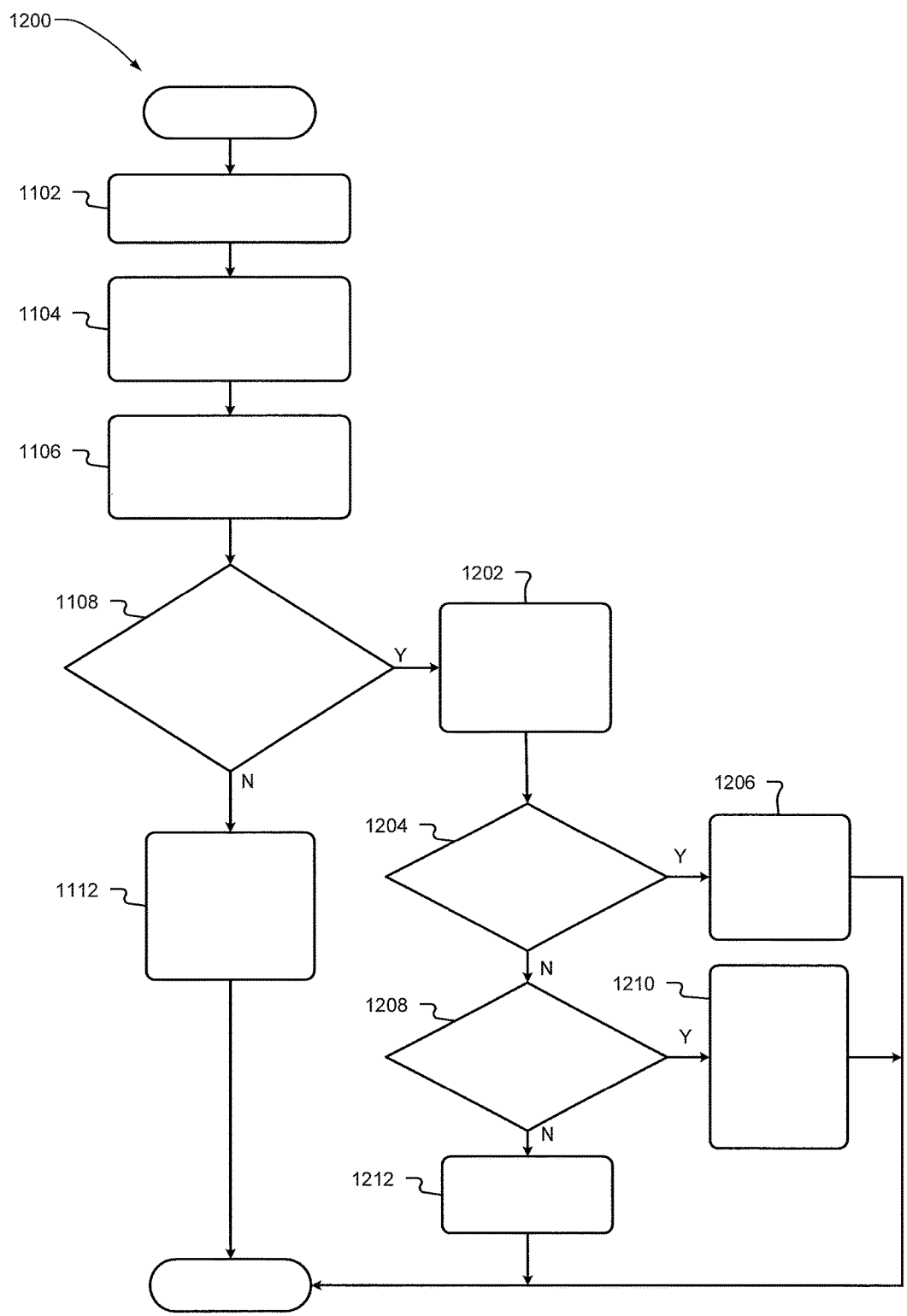
FIG. 12 is a flowchart illustrating a method for performing anomaly detection incorporating vehicle operating state parameters.

FIGS. 11-12 provide an example of how consideration of vehicle operating state parameters may improve anomaly and intrusion detection. More specifically, FIG. 11 is a flowchart illustrating a method for performing anomaly detection without the benefit of vehicle operating state parameters, while FIG. 12 is a method for performing anomaly detection utilizing vehicle operating state parameters.

With regard to the flowchart of FIG. 11, the method 1100 begins at 1102 where Mode 0x28 is functionally broadcast from CAN bus 6. Mode 0x28 refers to a unified diagnostic services (UDS) state that limits communications on one or more network buses of a vehicle. At 1104, the CGM of the vehicle passes the CAN communication to the anomaly detection module. At 1106, the anomaly detection module detects whether the CAN communication is adversarial based, for example, on predefined rules. At 1008, as part of the anomaly detection process, a determination is made as to whether the mode 0x28 originated on a diagnostic bus, such as CAN bus 6 or CAN bus 7. If the mode 0x28 did originate on a diagnostic bus, the method 1100 proceeds to 1110 where is determined that the mode 0x28 could be reflective of a service routine and that no anomalous behavior is detected. Following 1110, the method 1100 may conclude. If, however, the mode 0x28 did not originate on a diagnostic bus, the method 1100 proceeds to 1112 where it is determined that the mode 0x28 originated on CAN 1 and anomalous behavior is detected. Following 1112, the method 1100 may conclude.

Turning now to FIG. 12, another method 1200 is provided. Steps 1102 through 1112 proceed substantially in accordance with the descriptions of those steps set forth above with regard to FIG. 11. However, method 1200 incorporates the use of vehicle operating state parameters beginning at 1202 to improve the accuracy of anomaly detection. Specifically, following a determination that the mode 0x28 did originate on a diagnostic bus at 1108, the method 1200 proceeds to 1202 where a determination is made that the mode 0x28 could be reflective of a service routine and that no anomalous behavior is detected.

However, rather than concluding following this step (as was the case in the method 1100 of FIG. 11), the method 1200 proceeds to 1204 where a determination is made as to whether the 0x28 occurred while the vehicle transmission was in drive. If so, the method 1200 proceeds to 1206 where a determination is made that the 0x28 should only occur while the vehicle transmission is in park, and anomalous behavior is detected and logged. If it is determined that the 0x28 occurred while the vehicle transmission was not in drive, the method 1200 proceeds to 1208 where a determination is made as to whether the 0x28 occurred while the vehicle's speed exceeded 3 kilometers-per-hour (kpH). (Although 3 kpH is the threshold used in this example, those having ordinary skill in the art will appreciate that any suitable speed threshold may be incorporated as part of this step without deviating from the teachings herein.)

If the 0x28 occurred while the vehicle's speed exceeded 3 kpH, the method 1200 proceeds to 1210 where it is determined that the 0x28 should only occur while the vehicle is motionless, and anomalous behavior is detected and logged. If it is determined that the 0x28 occurred while the vehicle's speed did not exceed 3 kpH, the method 1200 proceeds to 1212 where a determination is made that no anomalous behavior was detected. Following 1210 or 1212, the method 1200 concludes.

Figure 13:
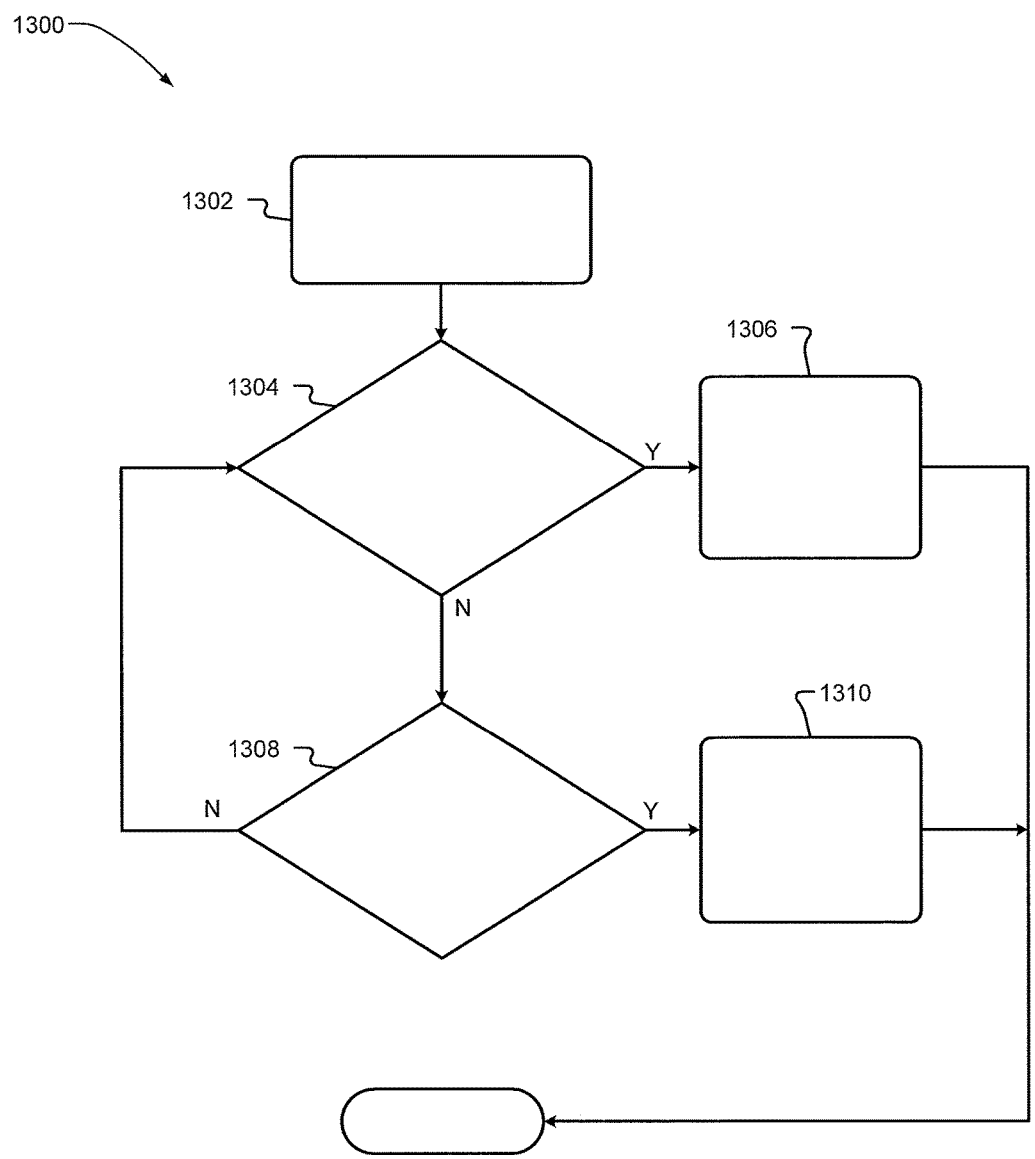
FIG. 13 is a flowchart illustrating a method for performing anomaly detection based on predefined rules concerning a controller area network (CAN) packet forwarding policy.

With reference to FIG. 13, a flowchart is provided illustrating a method 1300 for performing anomaly detection based on predefined rules concerning a CAN packet forwarding policy. Although the example shown in FIG. 13 applies to a CAN packet forwarding policy, those having ordinary skill will recognize that the method 1300 could apply equally to other types of network messages, such as Ethernet messages or the like. Furthermore, the method 1300 assumes that the component of the system performing anomaly detection receives all network messages as well as all messages that the CGM either has or will be forwarding. The CAN packet forwarding policy reflected in FIG. 13 may, for example, ensure that any message that was routed within the vehicle network without using the CGM will be detected as anomalous.

The method 1300 begins at 1302 where a CAN message is obtained. At 1304, a determination is made as to whether the CAN message was successfully transmitted. If so, the method 1300 proceeds to 1306 where no violation of any predefined rules is detected and the system waits for the next CAN message. If, however, it is determined at 1304 that the CAN message was not successfully transmitted, the method 1300 proceeds to 1308. At 1308, a determination is made as to whether the CAN message was seen on the in-vehicle network. If not, the method 1300 proceeds back to 1304. However, if the CAN message was seen on the in-vehicle network, the method 1300 proceeds to 1310 where it is determined that a predefined rule was violated (which may lead to a detection of an anomaly). Following 1310, the method concludes.

Figure 14:
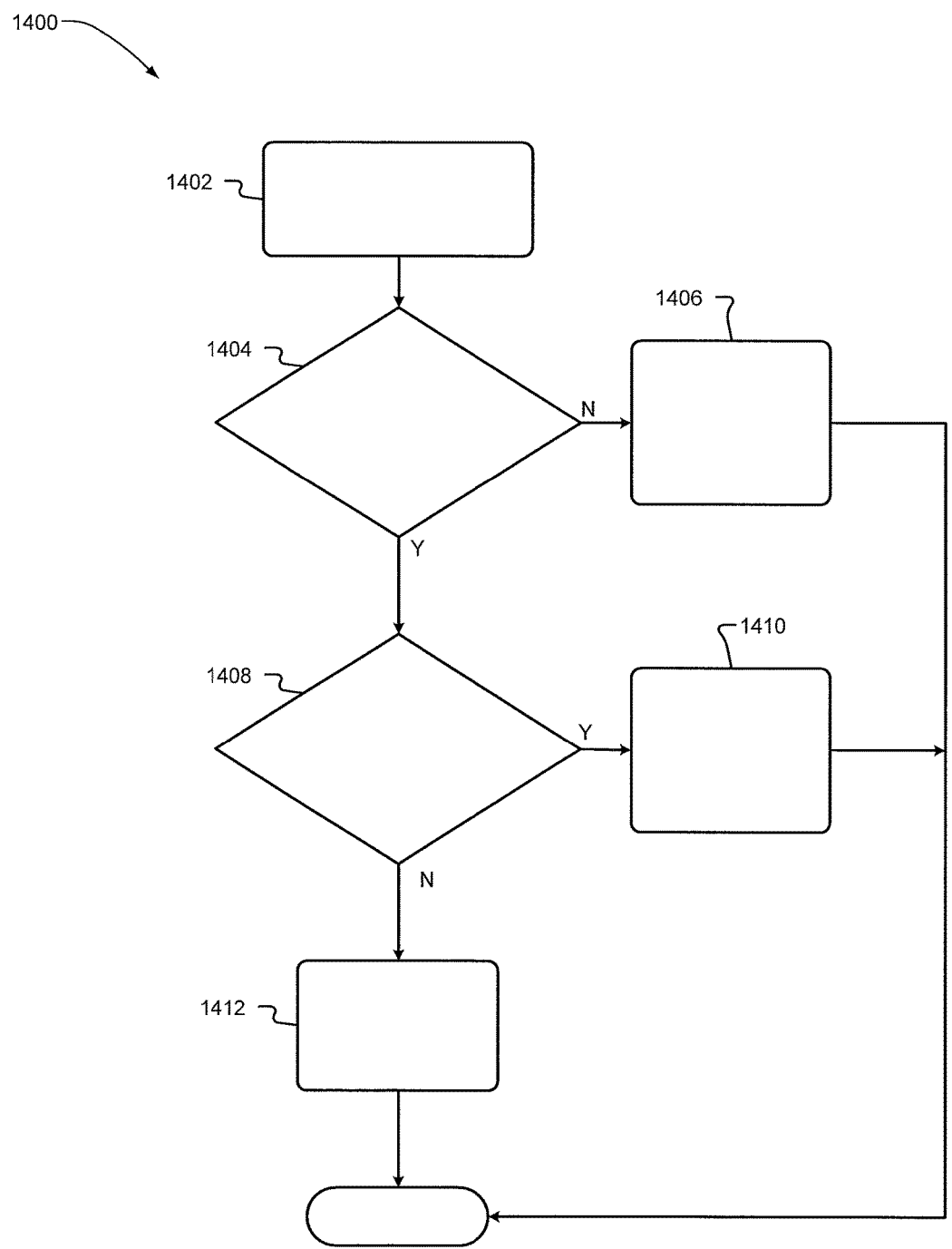
FIG. 14 is a flowchart illustrating a method for performing anomaly detection based on predefined rules concerning an allowed vehicle-state policy.

Referring now to FIG. 14, a flowchart illustrating a method 1400 for performing anomaly detection based on predefined rules concerning an allowed vehicle-state policy is provided. Although the example shown in FIG. 14 applies to a CAN message, those having ordinary skill will recognize that the method 1400 could apply equally to other types of network messages, such as Ethernet messages or the like.

The method 1400 begins at 1402 where a CAN message having a CAN_ID is obtained. At 1404, a determination is made as to whether the CAN-ID is associated with a predefined rule. If not, the method 1400 proceeds to 1406 where no violation is detected and the system waits for the next CAN message. However, if it is determined that the CAN_ID is associated with a rule, the method 1400 proceeds to 1408 where a determination is made as to whether the associated rule's allowed state matches a current state of the vehicle. If so, the method 1400 proceeds to 1410 where no violation is detected and the system waits for the next CAN message. However, if it determined that the associated rule's allowed state does not match the current state of the vehicle, the method 1400 proceeds to 1412 where a rule violation is detected. Following 1406, 1410, and 1412, the method 1400 concludes.

Figure 15:
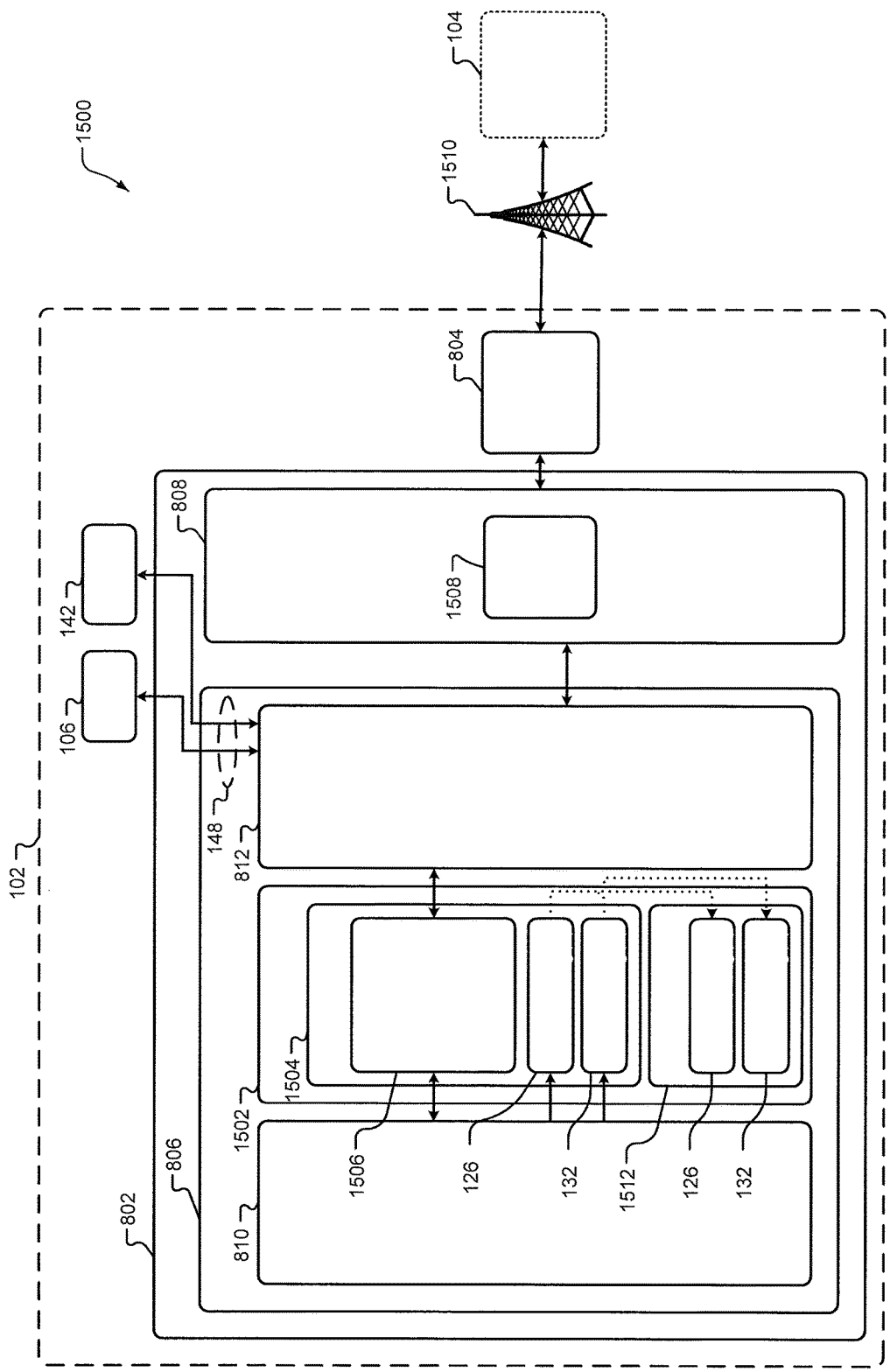
FIG. 15 is a functional block diagram illustrating another example of an intrusion detection system.

Referring now to FIG. 15, another example of a system 1500 for performing intrusion detection within an in-vehicle network is shown. The system 1500 includes the vehicle 102 wirelessly connected to the remote computing system 104 via a wireless network 1510. The system 1500 of FIG. 15 is similar to the system 100 of FIG. 1 and the system 800 of FIG. 8. However, the system 1500 of FIG. 15 illustrates additional details concerning, among other things, the CGM 802. More specifically, FIG. 15 illustrates an architecture for the CGM 802 that allows a node in a challenged network (i.e., the second core 810 of the first microcontroller 806) to monitor the network that it is functionally isolated from. Moreover, FIG. 15 illustrates the manner in which shared memory 1502—shared between the second core 810 and first core 812 of the first microcontroller 806—may be utilized to securely make network messages visible to a node that is isolated from the network. Other advantages will become apparent with reference to FIG. 15 and the following discussion.

As noted above, the vehicle 102 may include a CGM 802 and a wireless transmitter 804 connected to the CGM 802. The wireless transmitter 804 may be configured to transmit (and obtain) messages, signals, commands, etc. to (and from) the remote computing system 104 via the wireless network 1510.

The CGM 802 may include a first microcontroller 806 and a second microcontroller 808. According to some example implementations, each microcontroller 806, 808 may constitute a 32-bit microcontroller. However, other suitable microcontroller architectures may be equally employed within the context of this disclosure without deviating from the teachings herein. According to some examples, the CGM 802 may be implemented as one or more ECUs or the like.

The first microcontroller 806 may include a first core 812, a second core 810, and memory 1502 connected to both the first and second cores 812, 810. The first core 812 may be connected to one or more CAN buses 106 and/or one or more Ethernet buses 142, so as to obtain network message(s) 148 therefrom. According to some examples, the first core 812 may be configured to write the network message(s) 148 to the memory 1502 (e.g., the shared memory 1506) so that the messages may be accessed and analyzed by the second core 810 for purposes of performing anomaly detection in accordance with the teachings of the present disclosure. According to some examples, the shared memory 1506 may only be directly accessible by the first core 812 and the second core 810 of the first microcontroller 806 to protect the intrusion detection system 1500 itself from being compromised by a cyber-attack, or the like.

The memory 1502 may include secured random access memory (RAM) 1504 and secured non-volatile memory (NVM) 1512. The secured RAM 1504 may be implemented as any suitable type of RAM including but not limited to SRAM, DRAM, FPM DRAM, EDO DRAM, SDRAM, DDR SDRAM, RDRAM, CMOS RAM, etc. The secured RAM 1504 may include shared memory 1506 that is shared between the first core 812 and the second core 810 of the first microcontroller 806. The secured RAM 1504 may also store one or more resident incident logs 126 and/or one or more transmitted incident logs 132. The resident incident log(s) 126 and/or transmitted incident log(s) 132 may be written to the secured RAM 1504 by the second core 810, for example, as part of an incident log generation process following anomaly detection.

The secured NVM 1512 may be implemented as any suitable type of NVM including but not limited to flash, ROM, ferroelectric RAM, magnetic storage devices, optical disks, etc. The secured NVM 1512 may include one or more resident incident logs 126 and/or one or more transmitted incident logs 132. According to some implementations, the resident incident log(s) 126 and/or transmitted incident log(s) 132 may be transferred or backed-up from the secured RAM 1504 to the secured NVM 1512. For example, the second core 810 may be configured to write the resident incident log(s) 126 and/or transmitted incident log(s) 132 to the secured NVM 1512 prior to the memory 1502 losing power (e.g., in response to a vehicle ignition being switched off or the like). While the foregoing example contemplates the second core 810 writing the resident incident log(s) 126 and/or transmitted incident log(s) 132 to the secured NVM 1512 prior to the memory 1502 losing power, the present disclosure equally contemplates other, non-power down scenarios, whereby the second core 810 writes the resident incident log(s) 126 and/or transmitted incident log(s) 132 to the secured NVM 1512.

The second microcontroller 808 may be connected to the first microcontroller 806 via any suitable communication channel and may be configured to facilitate communication between the first microcontroller 806 and the remote computing system 104. More specifically, whereas, according to some examples, the first microcontroller 806 does not include a network stack (and consequently, cannot communicate outside the in-vehicle network), the second microcontroller 808 does include a network stack 1508. The network stack 1508 allows the second microcontroller 808 to communicate over networks external to the vehicle 102 (e.g., wireless network 1510) through the wireless transmitter 804. In this manner, the second microcontroller 808 may serve as an interface, or gateway, between the first microcontroller 806 and networks external to the vehicle 102.

In operation, the system 1500 may function as follows to detect intrusions within a network of the vehicle 102. The first core 812 of the first microcontroller 806 may obtain network message(s) 148 from one or more communication buses of the vehicle (e.g., the CAN bus(es) 106 and/or Ethernet bus(es) 142). The network message(s) 148 obtained from the communication bus(es) may emanate from other components in the vehicle (not shown) including, but not limited to, a data link connector (DLC), such as an OBD-II, a center console, etc. The network message(s) 148 may describe one or more events associated with a vehicle, as explained more fully above with regard to FIG. 1.

The first core 812 may write the one or more messages 148 to the memory 1502. More specifically, according to some examples, the first core 812 may write the network message(s) to the shared memory 1506, such that the messages 148 are accessible (i.e., may be read) by the second core 810. In addition to writing the network messages(s) 148 to the memory, the first core 812 may also write additional information to the memory (e.g., the shared memory 1506), so that the additional information is accessible by the second core 810 for purposes of, for example, performing anomaly detection and incident log generation. For example, the first core 812 may write the following additional types of information to the memory 1502: (i) routed network messages; (ii) diagnostic messages; and/or (iii) operating state parameters of the vehicle. According to some examples, the operating state parameters of the vehicle may be stored in the memory 1502 according to the data structure illustrated in FIG. 10 and discussed above.

The second core 810 may read the one or more network messages 148 stored in the memory 1502 (e.g., the shared memory 1506 of the secured RAM 1504) and perform anomaly detection and log generation based thereon. More specifically, the second core 810 may detect whether at least some of the one or more events described in the network message(s) 148 constitute an anomaly based on predefined rules (e.g., predefined rules 122). In addition, the second core 810 may generate one or more resident incident logs 126 based on the detected anomaly data (e.g., detected anomaly data 130 shown in FIG. 1).

As noted above, the one or more resident incident logs 126 may include metadata associated with one or more detected anomalous events. Furthermore, the second core 810 may generate one or more transmitted incident logs 132 based on the one or more resident incident logs 126. As also noted above, the transmitted incident log(s) 132 may correspond to respective resident incident log(s) 126. According to some examples, the one or more transmitted incident logs 132 may include less metadata than their respective, corresponding one or more resident incident logs 126 for purposes of, among other things, reducing data transmission costs when the transmitted incident log(s) 132 and/or resident incident log(s) 126 are transmitted from the vehicle 102 to the remote computing system 104 via the wireless network 1510.

The second core 810 may write any generated resident incident log(s) 126 and/or transmitted incident log(s) 132 to memory 1502, such that the log(s) 126, 132 may be (i) read by the first core 812; (ii) transmitted via the first core 812 of the first microcontroller 806 to the second microcontroller 808; and (iii) transmitted from the second microcontroller 808 to the remote computing system 104 over the wireless network 1510 via the wireless transmitter 804. More specifically, the second core 810 may write any generated resident incident log(s) 126 and/or transmitted incident log(s) 132 to the secured RAM 1504 and/or the secured NVM 1512. The first core 812 may read any generated resident incident log(s) 126 and/or transmitted incident log(s) 132 written to memory 1502 by the second core 810 via the secured RAM 1504 (including the shared memory 1506) and/or the secured NVM 1512.

Among other advantages, the architecture of the CGM 802 allows for the anomaly detection and incident log generation functions of the intrusion detection system 1500 to be isolated within the second core 810 of the first microcontroller 806, which does not possess direct access to a network stack (e.g., network stack 1508) according to implementations described herein. In this manner, the anomaly detection and log generation functions of the intrusion detection system 1500 may be protected from direct remote network attacks.

According to certain implementations, the system 1500 of FIG. 15 is further configured to generate and transmit acknowledgement signals substantially in accordance with the protocol described and illustrated with regard to FIG. 8 herein. For example, upon successfully receiving one or more transmitted incident logs 132 and/or resident incident logs 126 from the first microcontroller 806, the second microcontroller 808 may generate an acknowledgment signal (acknowledging successful receipt of the relevant one or more incident logs) and transmit that acknowledgment signal back to the first microcontroller 806. According to some examples, the first core 810 of the first microcontroller 806 may then write the acknowledgment signal to memory 1502 so that, for example, the second core 810 may read the acknowledgement to confirm that a given incident log was successfully transmitted along at least one "hop" of the system 1500.

Similarly, upon successfully receiving the one or more transmitted incident logs 132 and/or resident incident logs 126 from the second microcontroller 808 (via the wireless transmitter 804 and wireless network 1510), the remote computing system 104 may generate an acknowledgement signal and transmit that acknowledgement signal back to the second microcontroller 808, which may, in turn, forward the acknowledgment signal back to the first core 812 of the first microcontroller 806 where it may be written to memory 1502 or the like (and, ultimately read by the second core 810, if desired).

Finally, according to some examples, the remote computing system 104 may generate and transmit various commands to the vehicle for purposes of incident log administration and/or remedial action in the event a network intrusion is detected.

For example, and as discussed in additional detail with regard to FIG. 1 above, the remote computing system 104 may generate and transmit a log control command. The log control command may be transmitted from the remote computing system 104 to the second microcontroller 808, which may, in turn, pass the log control command to the first microcontroller 806. Upon obtaining the log control command, the first microcontroller 806 may take one or more of the following administrative actions with regard to the incident logs: erase at least one resident incident log of the one or more resident incident logs 126; adjust a memory allocation for at least one of the one or more resident incident logs 126; transmit at least one of the one or more resident incident logs 126 to the remote computing system 104; adjust content of at least one of the one or more resident incident logs 126 prior to transmission; adjust a log transmission rate associated describing a frequency at which transmitted incident log(s) 132 are transmitted from the first microcontroller 806 to the remote computing system 104; and/or restrict a data size of the one or more transmitted incident logs 132.

In addition, the remote computing system 104 may generate and transmit an intrusion response command. The intrusion response command may be transmitted from the remote computing system 104 to the second microcontroller 808, which may, in turn, pass the intrusion response command to the first microcontroller 806. Upon obtaining the intrusion response command, the first microcontroller 806 may take one or more of the following remedial actions: restrict communications from at least one of the one or more communication buses (e.g., CAN bus(es) 106 and/or Ethernet bus(es) 142) and/or illuminate a MIL of the vehicle 102.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
an anomaly detection circuit configured to:
obtain one or more network messages from one or more communication buses of a vehicle, wherein the one or more network messages describe one or more events associated with the vehicle; and
detect whether at least some of the one or more events constitute an anomaly based on predefined rules to provide detected anomaly event data,
wherein the anomaly detection circuit is configured to detect whether at least some of the one or more events constitute an anomaly based on the predefined rules by determining whether a given network message associated with a given event is visible on a network of the vehicle, and
wherein the anomaly detection circuit is configured to detect an anomaly when the network message is determined to be visible on the network of the vehicle;
a resident log generation circuit configured to:
obtain the detected anomaly event data; and
generate one or more resident incident logs based on the detected anomaly event data, wherein the one or more resident incident logs comprise metadata associated with one or more detected anomalous events; and
a transmitted log generation circuit configured to:
obtain the one or more resident incident logs;
generate one or more transmitted incident logs based on the one or more resident incident logs, wherein each of the one or more transmitted incident logs corresponds to a resident incident log; and
transmit the one or more transmitted incident logs to a computer system remote from the vehicle.

2. The system of claim 1, further comprising:
an electronic control unit (ECU) comprising memory, wherein the memory comprises at least some of the one or more resident incident logs.

3. The system of claim 2, wherein the ECU is configured to:
obtain a log control command from the computer system remote from the vehicle; and
in response to obtaining the log control command, perform at least one of the following:
erase at least one resident incident log of the one or more resident incident logs; and
adjust a memory allocation for at least one of the one or more resident incident logs.

4. The system of claim 1, wherein the transmitted log generation circuit is further configured to:
obtain a log control command from the computer system remote from the vehicle; and
in response to obtaining the log control command, perform at least one of the following:
transmit at least one of the one or more resident incident logs to the computer system remote from the vehicle;
adjust content of at least one of the one or more resident incident logs prior to transmission;
adjust a log transmission rate associated with the transmitted log generation circuit, wherein the log transmission rate describes a frequency at which transmitted incident logs are transmitted from the transmitted log generation circuit to the computer system remote from the vehicle; and
restrict a data size of the one or more transmitted incident logs.

5. The system of claim 1, further comprising a remedial action circuit configured to:
obtain an intrusion response command from the computer system remote from the vehicle; and
in response to obtaining the intrusion response command, perform at least one of the following:
restrict communications from at least one of the one or more communication buses; and
illuminate a malfunction indicator light (MIL) of the vehicle.

6. The system of claim 1, wherein each resident incident log of the one or more resident incident logs comprises a manifest and one or more incident log entries, wherein each incident log entry of the one or more incident log entries corresponds to a violation of one or more of the predefined rules.

7. The system of claim 6, wherein the manifest comprises:
a soft-part reference number identifying a rule set of the predefined rules to which a given resident incident log corresponds; and
a total rule violations summary describing a total number of incidents logged for all rule violations within a given rule set defined by the soft-part reference number.

8. The system of claim 6, wherein each of the one or more incident log entries includes one or more of the following:
the predefined rule that was violated;
a number of times that the predefined rule was violated;
a timeframe during which the predefined rule was violated;
the network message that violated the predefined rule; and
historical data concerning the incident, wherein the historical data comprises one or more of a timestamp describing a specific time that the predefined rule was violated and a state of the vehicle at the time that the predefined rule was violated.

9. The system of claim 1, wherein the one or more network messages comprise at least one of:
controller area network (CAN) messages from one or more CAN buses of the vehicle; and
ethernet messages from one or more ethernet buses of the vehicle.

10. The system of claim 1, wherein the predefined rules are based, at least in part, on operating state parameters of the vehicle.

11. The system of claim 10, wherein the operating state parameters of the vehicle comprise at least some of the following parameters:
speed of the vehicle;
operational mode of the vehicle;
power mode of the vehicle;
state of a transmission gear selector of the vehicle; and
presence of a test tool in connection with the vehicle.

12. The system of claim 1, further comprising the computer system remote from the vehicle.

13. The system of claim 12, wherein the computer system remote from the vehicle is configured to:

generate an acknowledgement signal in response to receiving a transmitted incident log from the transmitted log generation circuit; and transmit the acknowledgment signal to the vehicle over a wireless communication channel.

14. The system of claim 1, wherein the anomaly detection circuit is configured to:

detect the absence of an anomaly when the network message is determined not to be visible on the network of the vehicle.

15. The system of claim 1, wherein each of the one or more network messages are associated with respective message IDs, and wherein the anomaly detection circuit is configured to detect whether at least some of the one or more events constitute an anomaly based on the predefined rules by:

determining whether any of the predefined rules correspond to a given message ID; and in response to determining that a predefined rule corresponds to the given message ID, comparing an allowed state associated with the predefined rule with a current state of the vehicle.

16. The system of claim 15, wherein the anomaly detection circuit is configured to:

detect an anomaly when the current state of the vehicle does not correspond to the allowed state of the predefined rule.

17. The system of claim 15, wherein the anomaly detection circuit is configured to:

detect the absence of an anomaly when the current state of the vehicle corresponds to the allowed state of the predefined rule.

18. The system of claim 1, wherein each of the one or more transmitted incident logs comprises less metadata than its corresponding resident incident log.

19. A system comprising:

an anomaly detection circuit configured to:

obtain one or more network messages from one or more communication buses of a vehicle, wherein the one or more network messages describe one or more events associated with the vehicle; and detect whether at least some of the one or more events constitute an anomaly based on predefined rules to provide detected anomaly event data, a resident log generation circuit configured to:

obtain the detected anomaly event data; and generate one or more resident incident logs based on the detected anomaly event data, wherein the one or more resident incident logs comprise metadata associated with one or more detected anomalous events;

a transmitted log generation circuit configured to:

obtain the one or more resident incident logs;

generate one or more transmitted incident logs based on the one or more resident incident logs, wherein each of the one or more transmitted incident logs corresponds to a resident incident log; and transmit the one or more transmitted incident logs to a computer system remote from the vehicle; and an electronic control unit (ECU) comprising memory, wherein the memory comprises at least some of the one or more resident incident logs, wherein the ECU is configured to:

obtain a log control command from the computer system remote from the vehicle; and in response to obtaining the log control command, perform at least one of the following:

erase at least one resident incident log of the one or more resident incident logs; and adjust a memory allocation for at least one of the one or more resident incident logs.

20. A system comprising:

an anomaly detection circuit configured to:

obtain one or more network messages from one or more communication buses of a vehicle, wherein the one or more network messages describe one or more events associated with the vehicle; and detect whether at least some of the one or more events constitute an anomaly based on predefined rules to provide detected anomaly event data, a resident log generation circuit configured to:

obtain the detected anomaly event data; and generate one or more resident incident logs based on the detected anomaly event data, wherein the one or more resident incident logs comprise metadata associated with one or more detected anomalous events; and a transmitted log generation circuit configured to:

obtain the one or more resident incident logs;

generate one or more transmitted incident logs based on the one or more resident incident logs, wherein each of the one or more transmitted incident logs corresponds to a resident incident log; and transmit the one or more transmitted incident logs to a computer system remote from the vehicle, wherein each resident incident log of the one or more resident incident logs comprises a manifest and one or more incident log entries, wherein each incident log entry of the one or more incident log entries corresponds to a violation of one or more of the predefined rules, and wherein the manifest comprises:

a soft-part reference number identifying a rule set of the predefined rules to which a given resident incident log corresponds; and a total rule violations summary describing a total number of incidents logged for all rule violations within a given rule set defined by the soft-part reference number.

21. A system comprising:

an anomaly detection circuit configured to:

obtain one or more network messages from one or more communication buses of a vehicle, wherein the one or more network messages describe one or more events associated with the vehicle; and detect whether at least some of the one or more events constitute an anomaly based on predefined rules to provide detected anomaly event data, a resident log generation circuit configured to:

obtain the detected anomaly event data; and generate one or more resident incident logs based on the detected anomaly event data, wherein the one or more resident incident logs comprise metadata associated with one or more detected anomalous events; and a transmitted log generation circuit configured to:

obtain the one or more resident incident logs;

generate one or more transmitted incident logs based on the one or more resident incident logs, wherein each of the one or more transmitted incident logs corresponds to a resident incident log; and transmit the one or more transmitted incident logs to a computer system remote from the vehicle, wherein each of the one or more network messages are associated with respective message IDs, and wherein the anomaly detection circuit is configured to detect whether at least some of the one or more events constitute an anomaly based on the predefined rules by:
determining whether any of the predefined rules correspond to a given message ID; and
in response to determining that a predefined rule corresponds to the given message ID, comparing an allowed state associated with the predefined rule with a current state of the vehicle.

* * * * *